US011837157B2

(12) United States Patent
Oh et al.

(10) Patent No.: US 11,837,157 B2
(45) Date of Patent: Dec. 5, 2023

(54) DISPLAY MODULE AND DISPLAY APPARATUS HAVING THE SAME

(71) Applicant: SAMSUNG ELECTRONICS CO., LTD., Suwon-si (KR)

(72) Inventors: Jongsu Oh, Suwon-si (KR); Sangyoung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/834,548

(22) Filed: Jun. 7, 2022

(65) Prior Publication Data

US 2022/0301501 A1    Sep. 22, 2022

Related U.S. Application Data

(63) Continuation of application No. PCT/KR2022/000765, filed on Jan. 14, 2022.

(30) Foreign Application Priority Data

Jan. 15, 2021    (KR) .................. 10-2021-0006319

(51) Int. Cl.
*G09G 3/32*    (2016.01)
(52) U.S. Cl.
CPC ........... *G09G 3/32* (2013.01); *G09G 2310/08* (2013.01); *G09G 2330/021* (2013.01)
(58) Field of Classification Search
CPC ........ G09G 2330/021; G09G 3/2014; G09G 2310/08; G09G 3/32; G09G 3/2011; G09G 2320/0233; G09G 2300/026; G09G 5/10; G09F 9/302; G09F 9/3023; G06F 3/1446

See application file for complete search history.

(56) References Cited

U.S. PATENT DOCUMENTS

| 10,504,406 | B2 | 12/2019 | Shigeta et al. |
| 10,586,506 | B2 | 3/2020 | Im et al. |
| 11,056,047 | B2 | 7/2021 | Shigeta et al. |
| 11,289,016 | B2 | 3/2022 | Kim et al. |
| 11,495,171 | B2 | 11/2022 | Kim et al. |
| 11,538,404 | B2 * | 12/2022 | Han ..................... G09G 3/32 |

(Continued)

FOREIGN PATENT DOCUMENTS

| KR | 10-2007-0019087 A | 2/2007 |
| KR | 10-2017-0113883 A | 10/2017 |

(Continued)

*Primary Examiner* — Muhammad N Edun
(74) *Attorney, Agent, or Firm* — Sughrue Mion, PLLC

(57) ABSTRACT

A display module includes: a module substrate; a plurality of pixels provided on the module substrate; and a plurality of micro-pixel controllers provided in spaces between the plurality of pixels and configured to supply a drive current to at least two pixels among the plurality of pixels, where each micro-pixel controller of the plurality of micro-pixel controllers includes a pixel circuit configured to, based on a first voltage and a second voltage being applied to the micro-pixel controller, control an amplitude of the drive current based on the first voltage and control a pulse width of the drive current based on the second voltage, and, based on the display module being in a power saving mode, the first voltage is adjusted to decrease a brightness of a pixel in a specified region, among the plurality of pixels.

21 Claims, 29 Drawing Sheets

(56) References Cited

U.S. PATENT DOCUMENTS

| | | | |
|---|---|---|---|
| 2006/0087502 A1 | 4/2006 | Karidis et al. | |
| 2006/0146827 A1* | 7/2006 | Kim | G09G 3/3216 370/392 |
| 2008/0297452 A1 | 12/2008 | Roush et al. | |
| 2010/0309100 A1 | 12/2010 | Cok et al. | |
| 2014/0168037 A1 | 6/2014 | Sakariya et al. | |
| 2020/0005699 A1 | 1/2020 | Yi et al. | |
| 2020/0111404 A1 | 4/2020 | Kim et al. | |
| 2022/0036819 A1* | 2/2022 | Kang | G09G 3/3208 |

FOREIGN PATENT DOCUMENTS

| | | |
|---|---|---|
| KR | 10-2017-0121327 A | 11/2017 |
| KR | 10-2018-0114816 A | 10/2018 |
| KR | 10-2033108 B1 | 10/2019 |
| KR | 10-2020-0003534 A | 1/2020 |
| KR | 10-2020-0038735 A | 4/2020 |
| KR | 10-2020-0101605 A | 8/2020 |
| KR | 10-2020-0144041 A | 12/2020 |

* cited by examiner

DISPLAY MODULE AND DISPLAY APPARATUS HAVING THE SAME

CROSS-REFERENCE TO RELATED APPLICATION(S)

This application is a by-pass continuation of International Application No. PCT/KR2022/000765, filed on Jan. 14, 2022, in the Korean Intellectual Property Receiving Office, which is based on and claims priority to Korean Patent Application No. 10-2021-0006319, filed on Jan. 15, 2021 in the Korean Intellectual Property Office, the disclosures of which are incorporated herein by reference in their entireties.

BACKGROUND

1. Field

The disclosure relates to a display module for implementing an image using an inorganic light-drive signal, and a display apparatus having the same.

2. Description of Related Art

A display apparatus may be classified into an emissive display in which each pixel emits light by itself and a non-emissive display that requires a separate light source.

A liquid crystal display (LCD) is a representative non-emissive display, and requires a backlight unit configured to supply light from the rear of a display panel, a liquid crystal layer configured to serve as a switch to transmit/block light, a color filter configured to change supplied light to a desired color, and the like. Thus, the LCD is complex in structure and has a limitation in realizing a small thickness.

On the other hand, in the emissive display in which each pixel emits light by itself by including a light-emitting device for each pixel, components such as a backlight unit and a liquid crystal layer are not required and a color filter may also be omitted. Thus, the emissive display is structurally simple and can have a high degree of freedom in design. In addition, the emissive display may have a small thickness, and provide an excellent contrast ratio, brightness, and viewing angle.

Among emissive displays, a micro light-emitting diode (LED) display is one of flat panel displays and includes a plurality of LEDs each having a size of about 100 micrometers. In comparison with the LCD that requires a backlight, the micro-LED display may provide better contrast, response time, and energy efficiency.

Further, the micro-LED, which is an inorganic light-emitting device, has higher brightness, better light emission efficiency, and a longer lifespan in comparison with an organic LED (OLED), which requires a separate encapsulation layer for protecting organic materials.

SUMMARY

Provided are a display module and a display apparatus in which various circuits configured to drive an inorganic light emitting device are provided in a separate chip so that circuit testing and replacement and a manufacturing process of the display module or the display apparatus including the display module may be more easily performed.

Additional aspects will be set forth in part in the description which follows and, in part, will be apparent from the description, or may be learned by practice of the presented embodiments.

According to an aspect of the disclosure, there is provided a display module including: a module substrate; a plurality of pixels provided on the module substrate; and a plurality of micro-pixel controllers provided in spaces between the plurality of pixels and configured to supply a drive current to at least two pixels among the plurality of pixels, wherein each micro-pixel controller of the plurality of micro-pixel controllers includes a pixel circuit configured to, based on a first voltage and a second voltage being applied to the micro-pixel controller, control an amplitude of the drive current based on the first voltage and control a pulse width of the drive current based on the second voltage, and, based on the display module being in a power saving mode, the first voltage is adjusted to decrease a brightness of a pixel in a specified region, among the plurality of pixels.

The first voltage may be adjusted in units of columns, and the specified region may be defined by pixels provided in at least one column.

The first voltage of a same magnitude may be applied to micro-pixel controllers that control pixels provided in one column, among the plurality of micro-pixel controllers.

The first voltage of a same magnitude may be applied to micro-pixel controllers adjacent to each other in a column direction, among the plurality of micro-pixel controllers.

A first wiring used to apply the first voltage to the plurality of micro-pixel controllers may be provided on each set of micro-pixel controllers of the at least one column, and each set of micro-pixel controllers may include at least two micro-pixel controllers of the micro-pixel controllers that are adjacent to each other in a column direction.

The first voltage may be adjusted in units of rows, and the specified region may be defined by pixels provided in at least one row.

The first voltage of a same magnitude may be applied to micro-pixel controllers that control pixels provided in a same row, among the plurality of micro-pixel controllers.

The first voltage of a same magnitude may be applied to micro-pixel controllers among the plurality of micro-pixel controllers adjacent to each other in a row direction.

The display module may further include a first wiring through which the first voltage may be applied to the plurality of micro-pixel controllers, the first wiring being provided on each set of micro-pixel controllers of the at least one row, and each set of micro-pixel controllers may include two or more micro-pixel controllers of the micro-pixel controllers that are adjacent to each other in a row direction.

The plurality of micro-pixel controllers may be divided into a plurality of groups, and the specified region may be defined by pixels controlled by micro-pixel controllers included in at least one group among the plurality of groups.

Micro-pixel controllers belonging to a same group, among the plurality of micro-pixel controllers, may be supplied with a same magnitude of the first voltage.

Based on the display module being in a normal mode, the plurality of micro-pixel controllers may be supplied with a same magnitude of the first voltage.

According to an aspect of the disclosure, there is provided a display apparatus including: a module substrate; a plurality of pixels provided on the module substrate; a plurality of micro-pixel controllers provided in spaces between the plurality of pixels and configured to control two or more pixels among the plurality of pixels; a driver integrated circuit (IC) configured to apply a first voltage and a second voltage to the plurality of micro-pixel controllers; wherein each micro-pixel controller of the plurality of micro-pixel controllers includes a plurality of pixel circuits configured to, based on the first voltage and the second voltage being applied from the driver IC, control a pulse width of a drive current having an amplitude corresponding to the first voltage and the second voltage, and the driver IC is further configured to, based on the display apparatus being in a power saving mode, apply the first voltage of which a magnitude is increased or decreased to decrease a brightness of a pixel among the plurality of pixels in a specified region.

The display apparatus may further include a timing controller configured to determine the specified region based on image data.

Based on the display apparatus being in a normal mode, the driver IC may be further configured to apply the first voltage of a same magnitude to the plurality of micro-pixel controllers.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
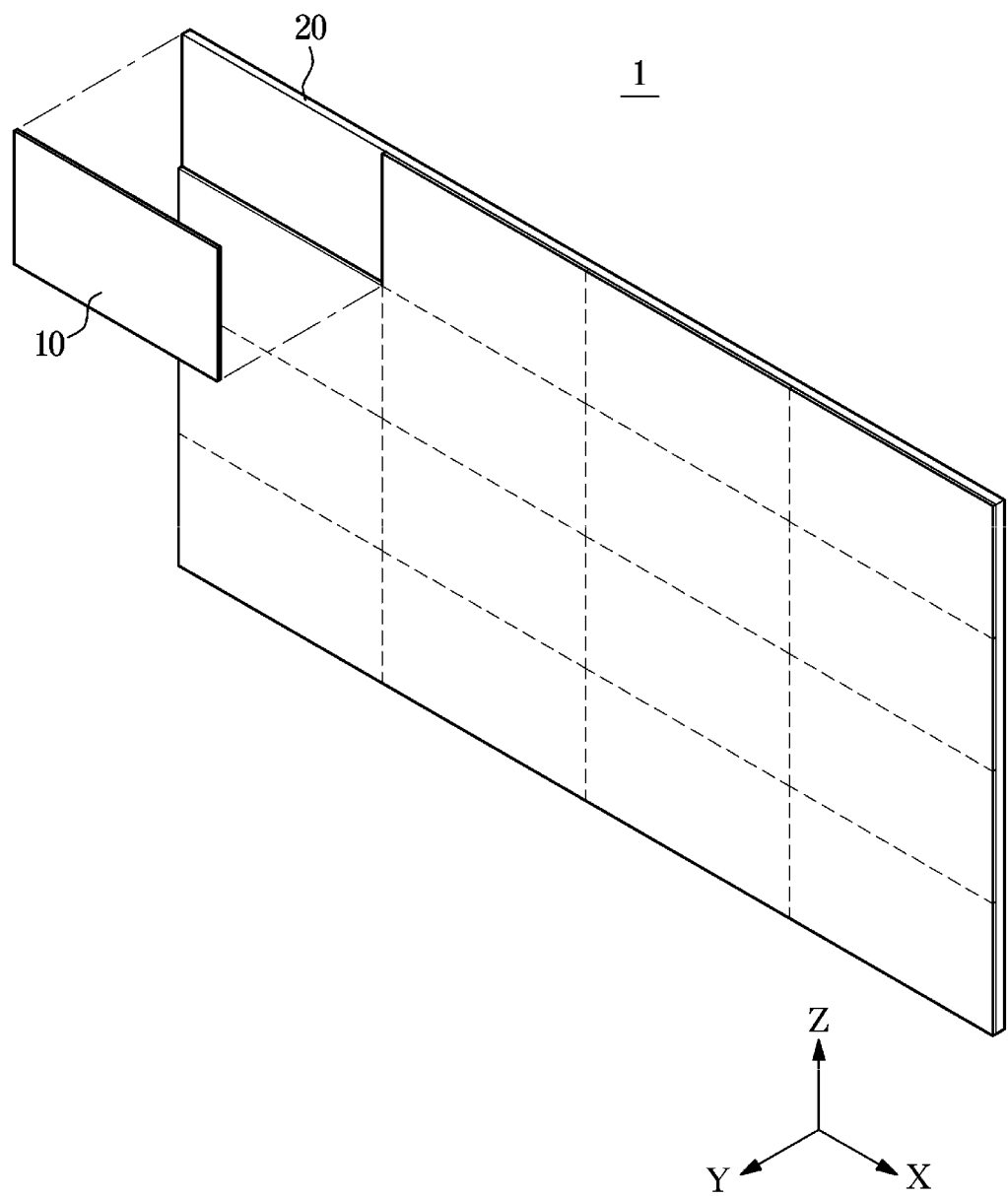
FIG. 1 is a diagram illustrating an example of a display module and a display apparatus including the same according to an embodiment.

Embodiments are described in detail with reference to the accompanying drawings. Like reference numerals denote like elements throughout the specification. In the specification, all elements of the embodiments are not described, and general contents in the art or repeated contents between the embodiments will not be described. Terms such as parts, modules, members, and blocks may be implemented using software or hardware, and a plurality of parts, modules, members, and blocks are implemented as a single element, or one part, module, member, or block may also include a plurality of elements.

Throughout the specification, when a part is referred to as being "connected" to another part, it includes "directly connected" to another part and "indirectly connected" to another part, and the "indirectly connected" to another part includes "connected" to another part through a wireless communication network, or electrically connected to another part through wiring, soldering, or the like.

In addition, when a part "includes" an element, another element may be further included, rather than excluding the existence of another element, unless otherwise described.

Throughout the specification, when a member is referred to as being "on" another member, the member is in contact with another member or yet another member is interposed between the two members.

Throughout the specification, when a member transmits or transfers a signal or data to another member, it does not preclude another member existing between the corresponding member and another member, and the signal or data is transmitted or transferred through another member unless otherwise described.

Through the specification, the expression of an ordinal number such as "first" and "second" is used to distinguish a plurality of members, and the used ordinal number does not indicate an arrangement order, a manufacturing order, importance, and the like of the members.

The singular expression includes a plural expression unless there are obvious exceptions in the context.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In each step, an identification symbol is used to refer to each step, the identification symbol does not limit the order of each step, and each step may be performed in an order different from the described order unless the context clearly indicates a specific order.

Hereinafter, a display module and a display apparatus including the display module according to one aspect will be described with reference to the accompanying drawings.

FIG. 1 is a diagram illustrating an example of a display module and a display apparatus including the same according to an embodiment.

The display apparatus according to an embodiment is a self-emissive display apparatus in which a light emitting device is disposed in each of pixels so that the pixel may emit light by itself. Accordingly, unlike a liquid crystal display (LCD) apparatus, since the display apparatus according to an embodiment does not require components such as a backlight unit and a liquid crystal layer, a thin thickness may be implemented, a structure is simple, and thus a design may be variously changed.

In addition, in the display apparatus according to an embodiment, an inorganic light emitting device such as an inorganic light emitting diode may be used as the light emitting device disposed in each of the pixels. A response time of the inorganic light emitting device is faster than that of an organic light emitting device such as an organic light emitting diode (OLED), and the inorganic light emitting device may provide high brightness with low power.

In addition, unlike the organic light emitting device which requires an encapsulation process because it is vulnerable to exposure to moisture and oxygen and has low durability, the inorganic light emitting device does not require an encapsulation process and has high durability. Hereinafter, the inorganic light emitting device, which will be described in the following embodiment, denotes the inorganic light emitting diode.

The inorganic light emitting device used in the display apparatus according to an embodiment may be a micro-LED having a size in which a length of a short side is about 100 μm, about several tens of μm, or several μm. As described above, when the LED having a size of a micro unit is used, a pixel size may be reduced and a high-resolution may be implemented in the same size screen.

In addition, when an LED chip is manufactured in the size of a micro unit, a problem of being broken when bent due to properties of an inorganic material may be solved. That is, when the micro-LED chip is transferred onto a flexible substrate, the LED chip is not broken even when the substrate is bent, and thus a flexible display apparatus may also be implemented.

The display apparatus, in which the micro-LED is used, may be applied to various fields by using a very small pixel size and a thin thickness. As an example, as illustrated in FIG. 1, a plurality of display modules 10 onto which a plurality of micro-LEDs are transferred may be tiled to be fixed to a housing 20 so as to implement a large-area screen. A display apparatus 1 having such a large-area screen may be used as a signage, an electronic board, and the like.

Alternatively, the display apparatus may be implemented as a foldable display apparatus, a rollable display apparatus, or the like, based on the feature of flexibility.

A three-dimensional coordinate system of XYZ-axes illustrated in FIG. 1 is based on the display apparatus 1, a plane on which a screen of the display apparatus 1 is positioned is an XZ-plane, and a direction in which an image is output or a direction in which an inorganic light emitting device emits light is a +Y direction. Since the coordinate system is based on the display apparatus 1, the same coordinate system may be applied to both of cases in which the display apparatus 1 is lying flat and in which the display apparatus 1 is in a standing state.

Generally, since the display apparatus 1 is used in a standing state, and a user watches an image from the front of the display apparatus 1, the +Y direction in which the image is output may be referred to as a forward direction, and the opposite direction may be referred to as a rearward direction.

In addition, the display apparatus 1 is generally manufactured in a lying state. Accordingly, a −Y direction of the display apparatus 1 may be referred to as a downward direction and the +Y direction may be referred to as an upward direction. That is, in an embodiment, which will be described below, the +Y direction may also be referred to as an upward direction or forward direction, and the −Y direction may also be referred to as a downward direction or rearward direction.

Except for an upper surface and a lower surface of the display apparatus 1 or the display module 10 having a flat plate shape, all of the remaining four surfaces may be referred to as side surfaces regardless of a posture of the display apparatus 1 or the display module 10.

In FIG. 1, a case in which the display apparatus 1 includes a plurality of display modules to implement a large-area screen is illustrated, but the embodiment of the display apparatus 1 is not limited thereto. The display apparatus 1 may include a single display module 10 and may be implemented as a television (TV), a wearable device, a portable device, a personal computer (PC) monitor, or the like.

The display module 10 may include pixels of an M×N (M and N are integers greater than or equal to two) array i.e., a plurality of pixels which are two-dimensionally arranged. In the embodiment, a case in which some components are two-dimensionally arranged may include not only a case in which some components are arranged on the same plane but also a case in which some components are arranged on different planes parallel to each other. In addition, the case in which the corresponding components are arranged on the same plane does not denote that upper ends of the arranged components should be positioned on the same plane and may include a case in which the upper ends of the arranged components are positioned on different planes parallel to each other.

A single pixel may include a plurality of subpixels which output light having different colors to provide various colors by mixing colors. For example, a single pixel may be formed with at least three subpixels which output light having different colors. Specifically, a single pixel may be formed with a red subpixel, a green subpixel, and a blue subpixel respectively corresponding to red (R), green (G), and blue (B). In this case, a red subpixel may output red light, a green subpixel may output green light, and a blue subpixel may output blue light.

Subpixels may also be arranged in a line along n X-axis direction and may be arranged in a line along a Z-axis direction, and may not be arranged in a line.

In addition, subpixels may be implemented to have sizes that are same as each other or different from each other.

The sizes or arrangement types of the subpixels are not limited as long as a single pixel includes the plurality of subpixels to generate various colors.

In addition, the pixel does not necessarily include the red subpixel which outputs the red light, the green subpixel which outputs the green light, and the blue subpixel which outputs the blue light. The pixel may also include a subpixel which outputs yellow light or white light. That is, a color or type of light output from each subpixel and the number of subpixels are not limited.

However, in an embodiment which will be described below, the case in which the pixel includes the red subpixel, the green subpixel, and the blue subpixel will be described as an example for the sake of description.

As described above, each of the display module 10 and the display apparatus 1 according to an embodiment is a self-emissive display apparatus of which each of the pixels may emit light by itself. Accordingly, inorganic light emitting devices which emit light of different colors may be disposed in the subpixels. For example, a red inorganic light emitting device may be disposed in the red subpixel, a green inorganic light emitting device may be disposed in the green subpixel, and a blue inorganic light emitting device may be disposed in the blue subpixel.

Accordingly, in the embodiment, the pixel may denote a cluster including a red inorganic light emitting device, a green inorganic light emitting device, and a blue inorganic light emitting device, and the subpixel may denote each of the inorganic light emitting devices.

Figure 2:
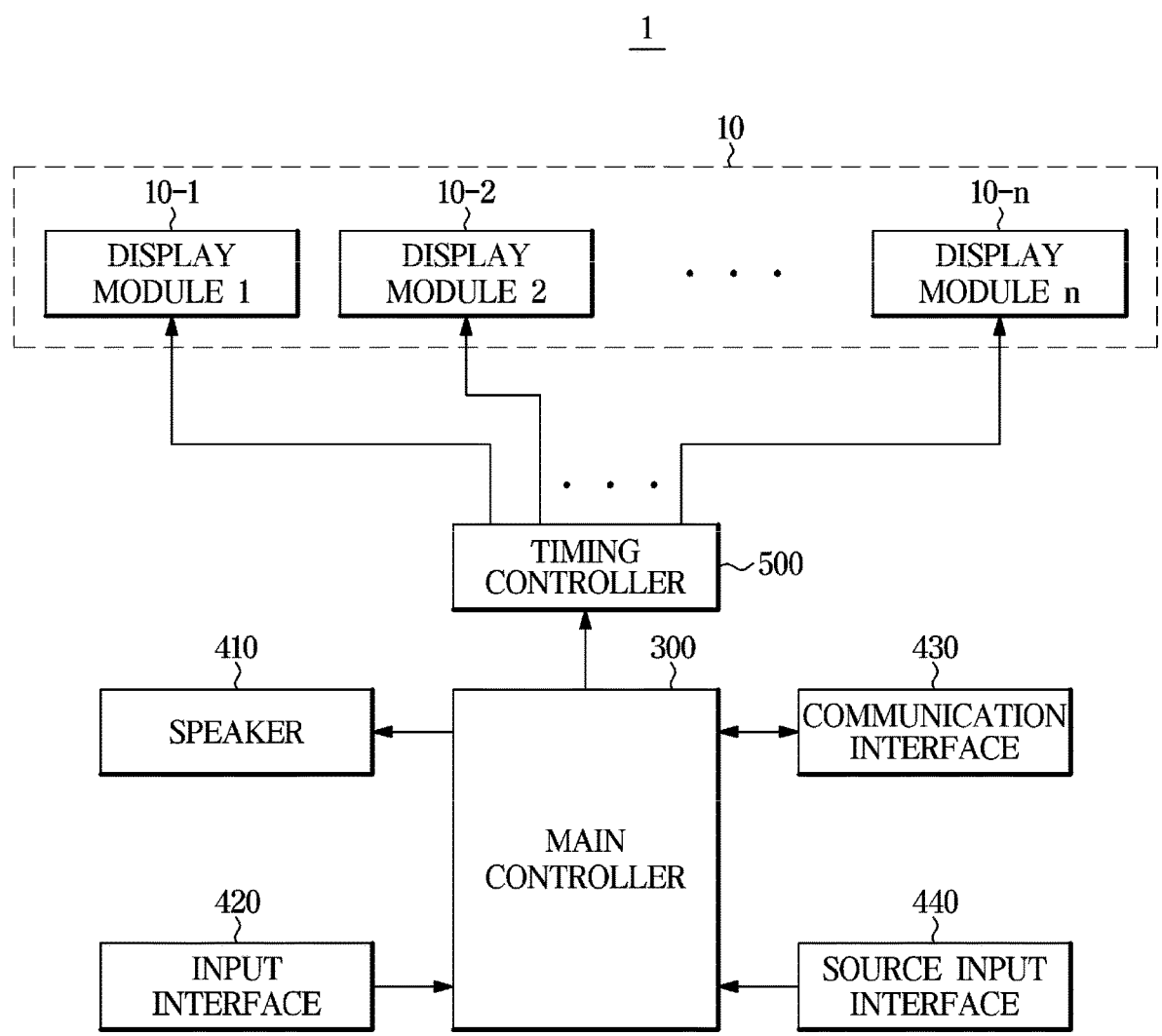
FIG. 2 is a block diagram illustrating a display apparatus according to an embodiment.
Figure 3:
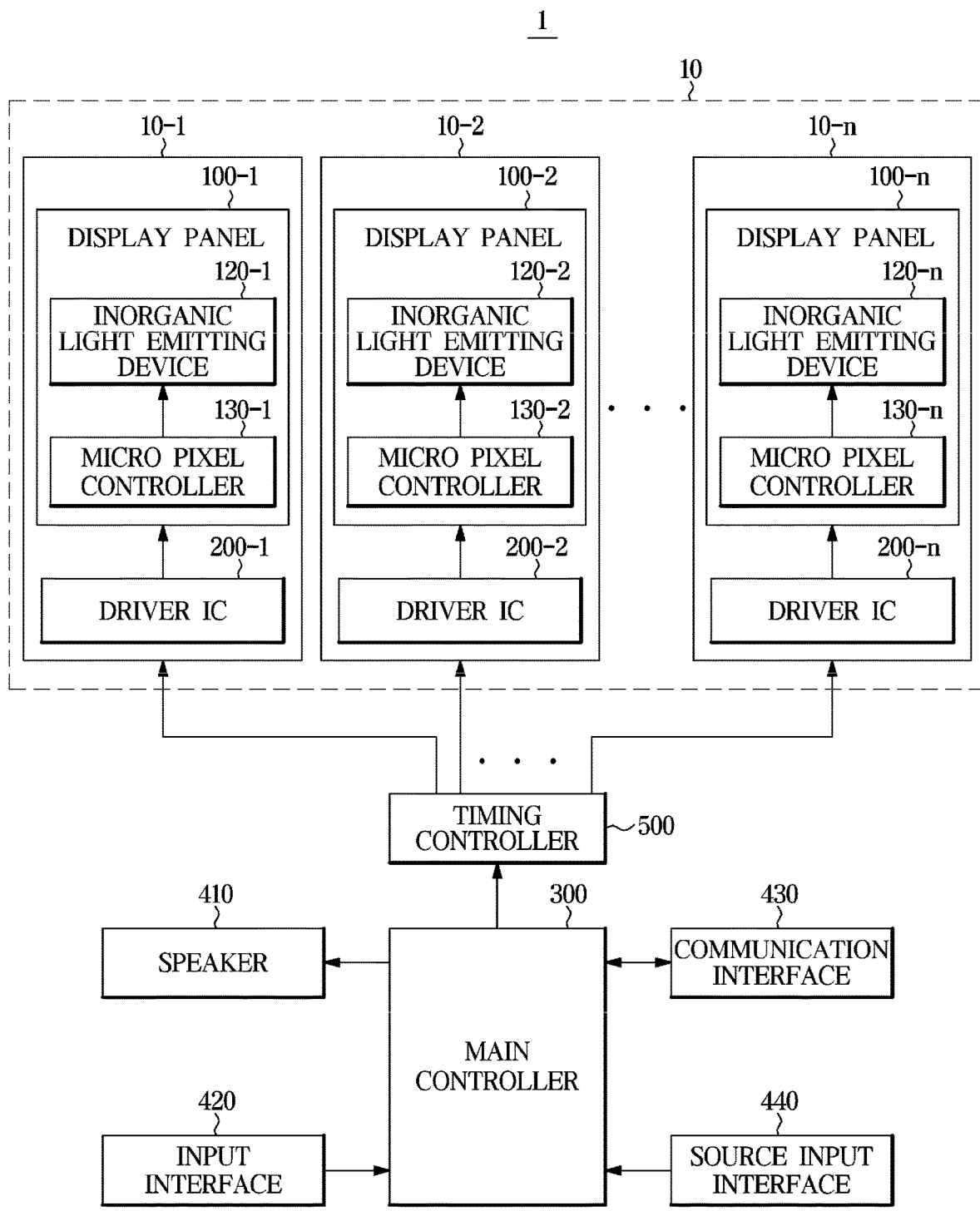
FIG. 3 is a block diagram illustrating a display apparatus according to an embodiment.

FIG. 2 is a block diagram illustrating a display apparatus according to an embodiment. FIG. 3 is a block diagram illustrating a display apparatus according to an embodiment.

Referring to FIG. 2, the display apparatus 1 according to an embodiment may include a plurality of display modules 10 including a display module 10-1, a display module 10-2, . . . and a display module 10-n (n is an integer greater than or equal to two), a main controller 300 and a timing controller 500 which control the plurality of display modules 10, a communication interface 430 which communicates with an external device, a source input interface 440 which receives a source image, a speaker 410 which outputs a sound, and an input device 420 which receives a command for controlling the display apparatus 1 from a user.

The input device 420 may also include a button or a touch pad provided in one area of the display apparatus 1, and in a case in which a display panel 100 is implemented as a touch screen, the input device 420 may include the touch pad provided on a front surface of a display panel 100. In addition, the input device 420 may also include a remote controller.

The input device 420 may receive various commands for controlling the display apparatus 1 from a user to perform power on/off, volume adjustment, channel adjustment, screen adjustment, various setting changes, and the like of the display apparatus 1.

The speaker 410 may be provided in one area of a housing 20 of the display apparatus 1, and a speaker module physically separated from the housing 20 may be additionally or alternatively provided.

The communication interface 430 may communicate with a relay server or other electronic devices to transmit and receive relevant data. The communication interface 430 may use at least one of various wireless communication methods such as 3rd Generation (3G), 4th Generation (4G), wireless local area net (LAN), Wi-Fi, Bluetooth, Zigbee, Wi-Fi Direct (WFD), ultra-wideband (UWB), Infrared Data Association (IrDA), Bluetooth Low Energy (BLE), near field communication (NFC), and Z-Wave. In addition, the communication interface 430 may also use a wired communication method such as Peripheral Component Interconnect (PCI), PCI-express, or Universe Serial Bus (USB).

The source input part 440 may receive a source signal input from a set-top box, a USB, an antenna, or the like. Accordingly, the source input interface 440 may include at least one selected from a source input interface group consisting of a High-Definition Multimedia Interface (HDMI) cable port, a USB port, an antenna port, and the like.

The source signal received by the source input interface 440 may be processed by the main controller 300 and converted into the form capable of being output from the display panel 100 and the speaker 410.

The main controller 300 and the timing controller 500 may include at least one memory which stores a program for performing an operation, which will be described below, and various pieces of data and at least one processor configured to execute the stored program.

The main controller 300 may process a source signal input through the source input interface 440 to generate an image signal corresponding to the input source signal.

For example, the main controller 300 may include a source decoder, a scaler, an image enhancer, and a graphic processor. The source decoder may decode a source signal compressed in a format such as Moving Picture Experts Group (MPEG) and the like, and the scaler may output image data of a desired resolution through resolution conversion.

The image enhancer may improve image quality of image data by applying various compensation techniques. The graphic processor may divide pixels of image data into red-green-blue (RGB) data to output together with a control signal such as a syncing signal for a display timing at the display panel 100. That is, the main controller 300 may output image data and a control signal which corresponds to a source signal.

The above-described operation of the main controller 300 is only an example applicable to the display apparatus 1, other operations may be further performed, and some operations among the above-described operations may be omitted.

The image data and the control signal output from the main controller 300 may be transmitted to the timing controller 500.

The timing controller 500 may generate various control signals such as a timing control signal for converting the image data transmitted from the main controller 300 to image data having the form that may be processed in a driver integrated circuit (IC) 200 (see FIG. 3) and displaying the image data on the display panel 100.

Although the display apparatus 1 according to an embodiment does not necessarily include the plurality of display modules 10, in the embodiment which will be described below, operations of the components will be specifically described using an example in which the display apparatus 1 includes the plurality of display modules 10 for description purposes.

Referring to FIG. 3, the plurality of display modules 10-1, 10-2 . . . and 10-n may respectively include the display panels 100-1, 100-2, . . . , 100-n which displays an image and the driver ICs 200-1, 200-2, . . . , 200-n which drives the respective display panels 100-1, 100-2, . . . , 100-n.

The display panels 100-1, 100-2, . . . , 100-n may include the plurality of pixels which are two-dimensionally arranged as described above, and each pixel may include the plurality of subpixels in order to implement various colors.

In addition, as described above, the display apparatus 1 according to an embodiment is a self-emissive display apparatus in which each pixel may emit light by itself. Accordingly, an inorganic light emitting device 120-1, 120-2, . . . , 120-n may be disposed in each of the subpixels. That is, each of the plurality of pixels may be formed with two or more inorganic light emitting devices 120-1, 120-2, . . . , 120-n.

Although each of the inorganic light emitting devices 120-1, 120-2, . . . , 120-n may be driven in an active matrix (AM) or passive matrix (PM) manner, in the embodiment which will be described below, the case in which the inorganic light emitting device 120-1, 120-2, . . . , 120-n is driven in the AM manner will be described as an example for the sake of description.

In the display module 10 according to an embodiment, each of the inorganic light emitting devices 120-1, 120-2, . . . , 120-n may be individually controlled by a respective micro-pixel controller 130-1, 130-2, . . . , 130-n, and the micro-pixel controllers 130-1, 130-2, . . . , 130-n may operate based on a drive signal output from the driver ICs 200-1, 200-2, . . . , 200-n or a timing control signal output from the timing controller 500.

The driver ICs 200-1, 200-2, . . . , 200-n may generate a data signal for representing a grayscale of an image based on the image data transmitted from the timing controller 500. As will be described below, the data signal may include a data voltage input to a pixel circuit (131P in FIG. 5).

Figure 4:
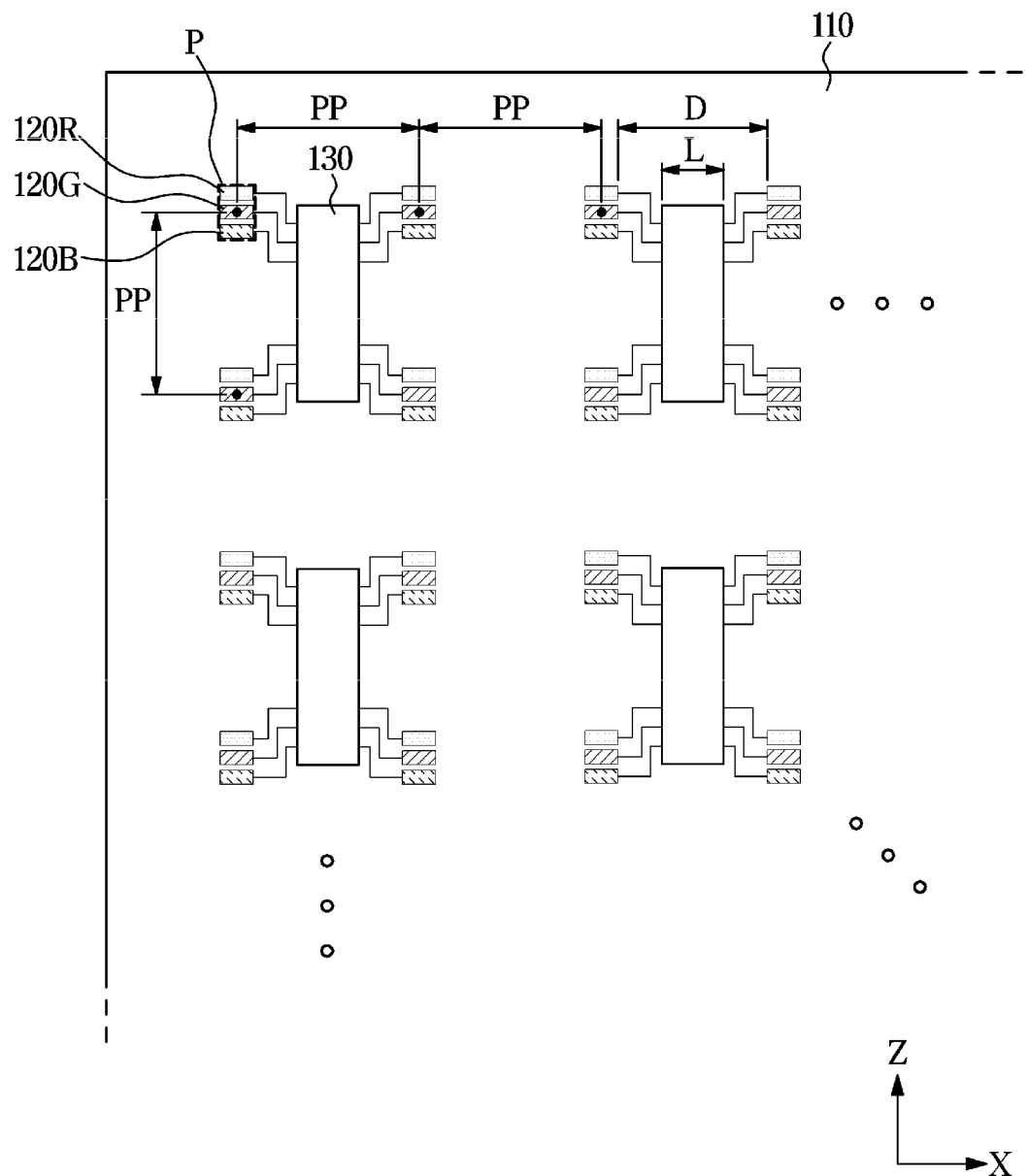
FIG. 4 is a diagram illustrating an example of arrangement of a micro-pixel controller and pixels in a display apparatus according to an embodiment.

FIG. 4 is a diagram illustrating an example of arrangement of a micro-pixel controller and pixels in a display apparatus according to an embodiment.

In the display module 10 according to an embodiment, a single micro-pixel controller 130 may control two or more pixels P. In an embodiment to be described below, a case in which a single micro-pixel controller 130 controls four pixels P arranged in a 2×2 array will be described as an example.

Referring to FIG. 4, the inorganic light emitting device 120 and the micro-pixel controller 130 may be disposed on the module substrate 110. The module substrate 110 may be implemented as one of substrates formed of various materials such as a silicon substrate, a glass substrate, a plastic substrate, a printed circuit board (PCB), an flexible printed circuit board (FPCB), and a cavity substrate.

Since the pixel circuit for switching and driving the inorganic light emitting device 120 is not directly mounted on the module substrate 110 but is provided in the micro-pixel controller 130, circuit devices, such as thin film transistors, do not need to be formed on the module substrate 110 in addition to the electrode pad or the wiring. Accordingly, when the type of the module substrate 110 is selected, since other restrictions, such as performance of the thin film transistor, do not need to be considered, the module substrate 110 may be implemented as a glass substrate having high durability against heat emitted from the inorganic light emitting device 120.

In addition, since the circuit devices, such as the thin film transistor, are not provided on the module substrate 110, the circuit devices may be prevented from being broken in a process of cutting the module substrate 110, forming the wire, or replacing the inorganic light emitting device 120, and a difficulty of manufacturing process of the display module 10 may be lowered.

The micro-pixel controller 130 may have a structure in which a pixel circuit for switching and driving the inorganic light emitting device 120 is mounted on an IC substrate. As will be described below, the pixel circuit includes a thin film transistor for switching and driving the inorganic light emitting device 120.

The IC substrate may be implemented as one of substrates formed of various materials, such as a silicon substrate, a glass substrate, a plastic substrate, a PCB, an FPCB, and a cavity substrate. Since the micro-pixel controller 130 is provided with a heat source, such as an inorganic light emitting device, the type of the substrate may be selected without limitation according to heat resistance of the material.

The thin film transistor formed on the IC substrate may be a silicon-based transistor or an oxide transistor. The silicon-based transistor may be an amorphous silicon (a-Si) thin film transistor, a single crystal thin film transistor, or a polycrystalline silicon thin film transistor. As an example, the polycrystalline thin film transistor may be a low temperature polycrystalline silicon (LTPS) thin film transistor generated under a low temperature condition.

In a case in which the thin film transistor included in the pixel circuit is the LTPS thin film transistor, there may be a restriction according to electron mobility when the IC substrate is selected. When the IC substrate is implemented as a silicon substrate, since a silicon substrate does not have a restriction on electron mobility when compared to a glass substrate, performance of the LTPS thin film transistor may be improved. In the embodiment, since the inorganic light emitting device 120, which is a heat source, is transferred onto the module substrate 110, the IC substrate may be implemented as the silicon substrate without a restriction according to heat resistance.

Before the micro-pixel controller 130 is transferred onto the module substrate 110, circuit testing may be performed on each of the micro-pixel controllers 130, and only the micro-pixel controller 130 determined as being good quality through the circuit testing may be mounted on the display module 10. Accordingly, when compared to a case in which the thin film transistor circuit is directly mounted on the module substrate, circuit testing and replacement of a defective product are easier.

As described above, the plurality of pixels P may be two-dimensionally arranged on the module substrate 110, and the micro-pixel controller 130 may be disposed in a space, in which the pixels P are not arranged, on the module substrate 110.

When the plurality of pixels P are disposed on the module substrate 110, a pixel spacing PP between adjacent pixels positioned on the top, bottom, left, and right sides may be the same. In embodiments, values that are described as the same may include not only a case in which the corresponding values are completely the same but also a case in which the corresponding values are within a predetermined error range.

The pixel spacing PP may be referred to as a pixel pitch, and in an embodiment, the pixel spacing PP is defined as a distance from a center of one pixel to a center of an adjacent pixel. However, the embodiment of the display module 10 is not limited thereto, and another definition about the pixel spacing PP may be applied.

For example, the micro-pixel controller 130 may have a rectangular hexahedron shape, and the micro-pixel controller 130 may have an ultra-small size in which a length L of a short side of an upper surface or lower surface of the micro-pixel controller 130 is smaller than a distance D between boundary lines of the pixels P adjacent to each other. The short side of the micro-pixel controller 130 may be disposed parallel to a line indicating the shortest distance between two pixels P adjacent to each other. In this case, the distance D between the boundary lines of the pixels P adjacent to each other may denote a distance between the inorganic light emitting devices 120 included in different pixels P among the inorganic light emitting devices 120 adjacent to each other.

The micro-pixel controller 130 may be disposed without affecting the spacing between the plurality of pixels P. Accordingly, even when the micro-pixel controller 130 is disposed between the pixels P, the spacing between the pixels P may be minimized to implement a high-resolution in the same region.

The micro-pixel controller 130 may supply a drive current to control target pixels. As illustrated in FIG. 4, when four control target pixels are provided for each micro-pixel controller 130, and one pixel has three sub-pixels (i.e., a red inorganic light emitting device 120R, a green inorganic light emitting device 120G, and a blue inorganic light emitting device 120B), a single micro-pixel controller 130 may supply a drive current to the twelve inorganic light emitting devices 120.

Figure 5:
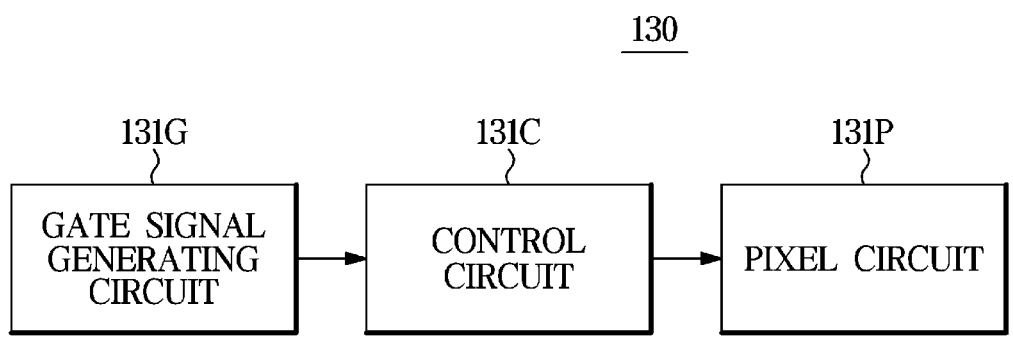
FIG. 5 is a block diagram illustrating an operation of a micro-pixel controller in a display apparatus according to an embodiment.
Figure 6:
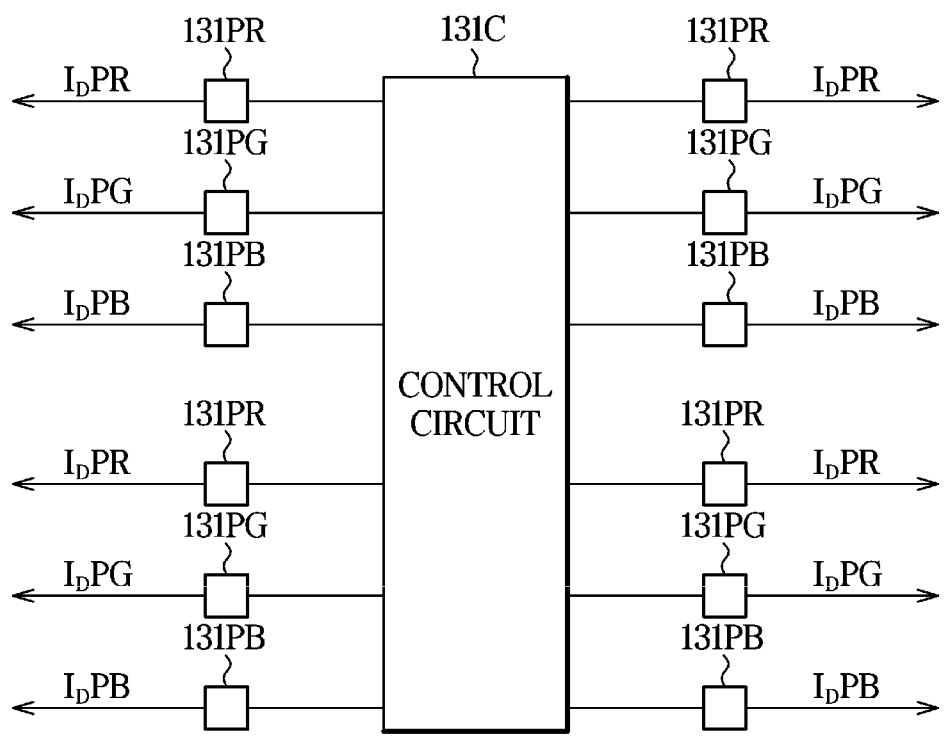
FIG. 6 is a diagram illustrating a signal flow in a micro-pixel controller in a display apparatus according to an embodiment.

FIG. 5 is a block diagram illustrating an operation of a micro-pixel controller in a display apparatus according to an embodiment, and FIG. 6 is a diagram illustrating a signal flow in a micro-pixel controller in a display apparatus according to an embodiment.

Referring to FIGS. 5 and 6, the micro-pixel controller 130 may include a pixel circuit 131P to turn on/off the control target pixel and supply a drive current to the control target pixel and a control circuit 131C to appropriately distribute various signals input to the micro-pixel controller 130 to the pixel circuits 131P.

In addition, because a gate signal for turning on/off a pixel is generated in the micro-pixel controller 130, the volume and load of the driver IC 200 may be reduced, and current-resistance (IR) drop occurring in the process of transferring the gate signal may also be removed, and the complexity of wiring may also be reduced.

The micro-pixel controller 130 may include a gate signal generating circuit 131G. A timing control signal transmitted from the timing controller 500 may be input to the gate signal generating circuit 131G, and the gate signal generating circuit 131G may generate a gate signal for turning on/off a pixel based on the input timing control signal. The timing control signal may include a reset signal and a clock signal for generating a gate pulse.

The gate signals generated by the gate signal generating circuit 131G may be distributed to the pixel circuits 131P by the control circuit 131C. The control circuit 131C may distribute the gate signal to an appropriate pixel circuit 131P at an appropriate timing based on the timing control signal.

The gate signal generated in the micro pixel controller 130 may be transmitted to the next micro-pixel controller 130 adjacent in the row direction. For example, the micro-pixel controller 130 controlling the pixels arranged in the first column may generate a gate signal, and the generated gate signal may be transmitted to the next micro-pixel controller 130 adjacent in the row direction.

In an embodiment, the micro-pixel controllers 130 adjacent in the row direction may refer to micro-pixel controllers 130 of which control target pixels are disposed in the same row (i.e., micro-pixel controllers 130 that control pixels disposed in the same row). For example, when a single micro-pixel controller 130 controls pixels in a 2×2 array, a plurality of micro-pixel controllers 130 controlling pixels disposed in the first row and the second row on the module substrate 110 may refer to micro-pixels 130 arranged adjacent to each other in the row direction.

In addition, the micro-pixel controllers 130 adjacent in the column direction may refer to micro-pixel controllers 130 of which control target pixels are disposed in the same column (i.e., micro-pixel controllers 130 that control pixels disposed in the same column). For example, when a single micro-pixel controller 130 controls pixels in a 2×2 array, a plurality of micro-pixel controllers 130 controlling pixels disposed in the first column and the second column on the module substrate 110 may refer to micro-pixels 130 arranged adjacent to each other in the column direction.

A common wire for transmitting a gate signal may be used, and the micro-pixel controller 130 having received the gate signal may transmit the gate signal again to the next micro-pixel controller 130.

Also, the gate signal generating circuit 131G may also be provided in each of the micro-pixel controllers 130. Alternatively, the plurality of micro-pixel controllers 130 may be grouped, and one micro-pixel controller 130 in each group may generate a gate signal and transmit the generated gate signal to another micro-pixel controller 130 included in the same group.

The control circuit 131C may distribute the data signal transmitted from the driver IC 200 and the gate signal generated by the gate signal generating circuit 131G to the plurality of pixel circuits 131P for driving the control target pixels. Since the control circuit 131C appropriately distributes a plurality of signals input through one wire to the plurality of pixel circuits 131P so that the number of wirings required for the display panel 100 to be connected to the driver IC 200 or the timing controller 500 may be reduced.

When a single micro-pixel controller 130 controls four pixels, and a single pixel includes a red sub-pixel, a green sub-pixel, and a blue sub-pixel, a red sub-pixel circuit 131PR, a green sub-pixel circuit 131PG, and a blue subpixel circuit 131PB may be provided for each of the four pixels, as shown in the example of FIG. 6.

The red sub-pixel circuit 131PR may output a drive current $I_DPR$ for driving the red inorganic light emitting device 120R, the green sub-pixel circuit 131PG may output a drive current $I_DPG$ for driving the green inorganic light emitting device 120G, and the blue sub-pixel circuit 131PB may output a drive current $I_DPB$ for driving the blue inorganic light emitting device 120B.

Figure 7:
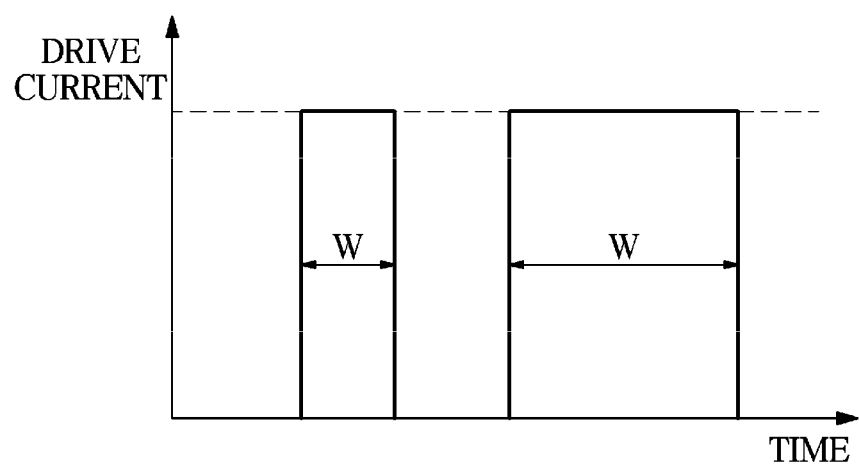
FIG. 7 is a graph illustrating a waveform of a drive current supplied to an inorganic light emitting device in a display apparatus according to an embodiment.
Figure 8:
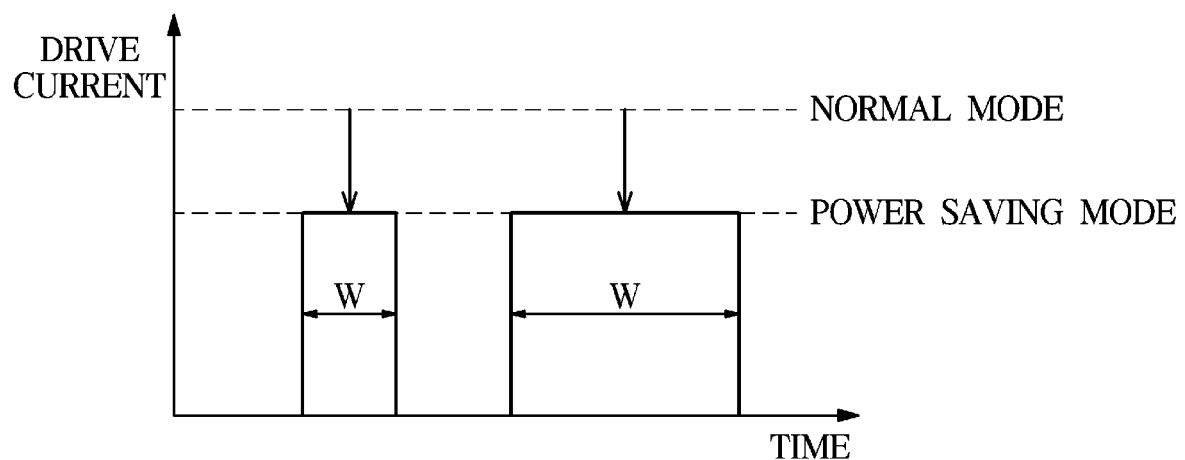
FIG. 8 is a graph schematically illustrating a waveform of a drive current supplied to an inorganic light emitting device in a display apparatus according to an embodiment.

FIG. 7 is a graph illustrating a waveform of a drive current supplied to an inorganic light emitting device in a display apparatus according to an embodiment. FIG. 8 is a graph schematically illustrating a waveform of a drive current supplied to an inorganic light emitting device in a display apparatus according to an embodiment.

A method of controlling brightness of the inorganic light emitting device includes a pulse amplitude modulation (PAM) method in which the amplitude of a drive current is controlled, a pulse width modulation method (PWM) in which the pulse width of a drive current is controlled, and a hybrid method in which the PAM method and the PWM method are combined.

The display apparatus 1 according to an embodiment may control the brightness of the inorganic light emitting device 120 using the PWM method. Referring to FIG. 7, the amplitude of the drive current ID supplied to the inorganic light emitting device 120 is fixed and the duration of light emission. That is, the pulse width W, is controlled so that various gradations may be expressed while preventing the phenomenon of color shift according to the change in current density.

In addition, since the inorganic light emitting device 120 may have a long lifespan without burn-in even at a high current density when compared to the organic light emitting device, the display apparatus 1 according to the embodiment may realize high luminance by supplying a high current to the inorganic light emitting device 120.

On the other hand, when a high current is always supplied to the inorganic light emitting device 120, power consumption may increase. Referring to FIG. 8, the display apparatus 1 according to an embodiment may reduce power consumption by lowering the amplitude of the drive current in a specific situation, such as a power saving mode. Hereinafter, the related configuration and operation of the display apparatus 1 will be described in detail.

Figure 9:
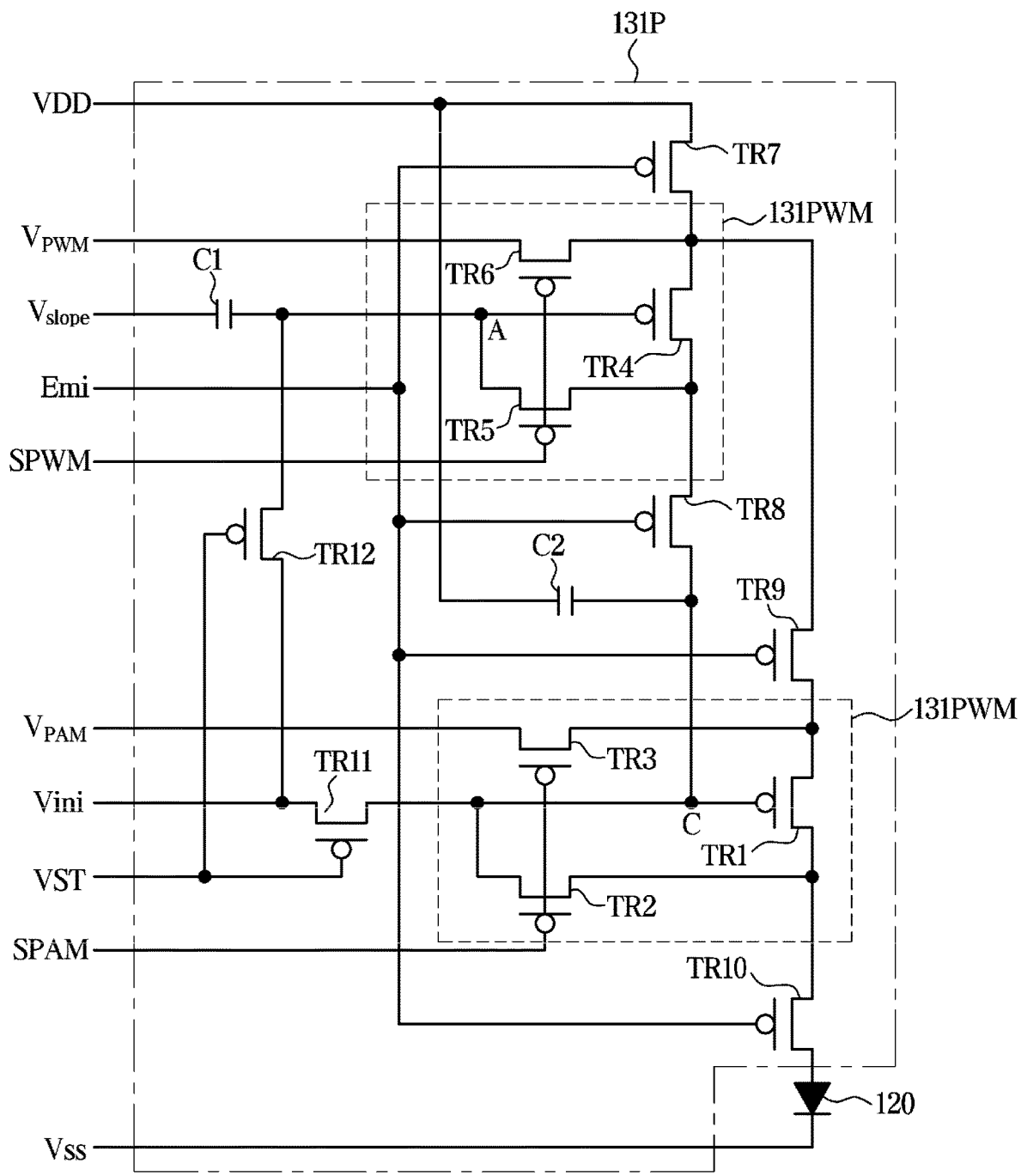
FIG. 9 is a diagram illustrating an example of a pixel circuit applicable to a display module according to an embodiment.

FIG. 9 is a diagram illustrating an example of a pixel circuit applicable to a display module according to an embodiment.

Referring to FIG. 9, the pixel circuit 131P may include a PWM control circuit 131PWM for controlling the pulse width of the drive current supplied to the inorganic light emitting device 120 and a PAM control circuit 131PAM for controlling the amplitude of the drive current supplied to the inorganic light emitting device 120.

A data signal provided from the driver IC 200 may be input to each of the PWM control circuit 131PWM and the PAM control circuit 131PAM, in which the data signal may include a first voltage for controlling the amplitude of the drive current and a second voltage for controlling the pulse width of the drive current. Hereinafter, the first voltage is referred to as a PAM data voltage and the second voltage is referred to as a PWM data voltage.

The PAM control circuit 131PAM includes a first driving transistor TR1, a first transistor TR2 connected between a drain terminal and a gate terminal of the first driving transistor TR1, and a second transistor TR3 connected, at a drain terminal thereof, to a source terminal of the first driving transistor TR1 and connected, at a gate terminal thereof, to a gate terminal of the first transistor TR2 and supplied with the PAM data voltage $V_{PAM}$ through a source terminal thereof.

According to a control signal SPAM, during a period in which the first and second transistors TR2 and TR3 are turned on, the PAM data voltage supplied from the driver IC 200 is applied through the source terminal of the second transistor TR3, so that a first voltage obtained by summing the applied PAM data voltage and the threshold voltage of the first driving transistor TR1 may be applied to the gate terminal of the first driving transistor TR1 through the first driving transistor TR1 and the second transistor TR2 in an on state.

The PWM control circuit 131PWM includes a second driving transistor TR4, a third transistor TR5 connected between a drain terminal and a gate terminal of the second driving transistor TR4, and a fourth transistor TR6 connected, at a drain terminal thereof, to a source terminal of the second driving transistor TR4 and connected, at a gate terminal thereof, to a gate terminal of the third transistor TR5 and supplied with the PWM data voltage through a source terminal thereof.

According to a control signal SPWM, during a period in which the third and fourth transistors TR5 and TR6 are turned on, the PWM data voltage $V_{PWM}$ supplied from the driver IC 200 is applied through the source terminal of the fourth transistor TR6, so that a second voltage obtained by summing the applied PWM data voltage and the threshold voltage of the second driving transistor TR4 may be applied to the gate terminal of the second driving transistor TR4 through the second driving transistor TR4 and the third transistor TR5 in an On state.

A fifth transistor TR7 has a source terminal connected to a power voltage VDD terminal of the pixel circuit 131P, and a drain terminal connected to a drain terminal of the fourth transistor TR6 and the source terminal of the second driving transistor TR4 in common.

The fifth transistor TR7 is turned on/off according to a control signal Emi to electrically connect or disconnect the power voltage VDD to or from the PWM control circuit 131PWM.

A sixth transistor TR8 has a source terminal connected to the drain terminal of the second driving transistor TR4 and a drain terminal connected to the gate terminal of the first driving transistor TR1.

A seventh transistor TR9 has a source terminal connected to the source terminal of the second driving transistor TR4, the drain terminal of the fourth transistor TR6, and the drain terminal of the fifth transistor TR7 in common, and has a drain terminal connected to the source terminal of the first driving transistor TR1 and the drain terminal of the second transistor TR3.

The sixth transistor TR8 and the seventh transistor TR9 are turned on/off according to a control signal Emi to electrically connect or disconnect the PWM control circuit 131PWM to or from the PAM control circuit 131PAM.

An eighth transistor TR10 has a source terminal connected to the drain terminal of the first driving transistor TR1, and a drain terminal connected to an anode terminal of the light emitting device 120. The eighth transistor TR10 is turned on/off according to a control signal Emi to electrically connect or disconnect the PAM control circuit 131PAM to or from the inorganic light emitting device 120.

A first capacitor C1 is connected, at one end thereof, to the gate terminal of the second driving transistor TR4 and the drain terminal of the third transistor TR5 in common, and is supplied at the other end thereof with a slope voltage Vslope, which linearly changes.

A ninth transistor TR11 has a drain terminal connected to the gate terminal of the first driving transistor TR1 and the drain terminal of the first transistor TR2 in common, and a source terminal to which an initial voltage Vini is applied. A tenth transistor TR12 has a source terminal connected to the one end of the first capacitor C1 and a drain terminal connected to the source terminal of the ninth transistor TR11.

A second capacitor C2 has one end connected to the power voltage terminal and the other end connected to the gate terminal C of the first driving transistor TR1, the drain terminal of the first transistor TR2, the drain terminal of the ninth transistor TR11, and the drain terminal of the sixth transistor TR8 in common.

The ninth transistor TR11 and the tenth transistor TR12 are turned on according to a control signal VST, and apply an initial voltage Vini to the gate terminal of the first driving transistor TR1 and the gate terminal of the second driving transistor TR4.

The ninth transistor TR11 and the tenth transistor 252, after the gate terminal voltages of the first and second driving transistors TR1 and TR4 are initialized, in order to prevent the power voltage VDD from being coupled to the gate terminal C of the first driving transistor TR1 through the second capacitor C2, are maintained in an on-state for a predetermined time according to a control signal VST even after a power voltage VDD is applied to the one end of the second capacitor C2 such that the initial voltage Vini is applied to the gate terminals of the first and second driving transistors TR1 and TR4.

A cathode terminal of the inorganic light emitting device 120 is connected to a ground voltage VSS terminal.

In a detailed operation of the pixel circuit 131P, when the third and fourth transistors TR5 and TR6 are turned on according to a control signal SPWM (for example, −5V), a PWM data voltage sequentially passes through the fourth transistor TR6, the second driving transistor TR4, and the third transistor TR5, and a compensated voltage (a voltage equal to the sum of the PWM data voltage and the threshold voltage of the second driving transistor TR4) is input to node A. Accordingly, the compensated voltage is stored in the first capacitor C1 and node A is maintained in a floating state.

The control signal SPWM corresponds to a signal for sequentially turning on a plurality of two-dimensionally arranged pixels in units of rows (i.e., a gate signal), and may be generated by the gate signal generating circuit 131G described above.

Accordingly, the third and fourth transistors TR5 and TR6 included in the PWM control circuit 131PWM are sequentially turned on a row-by-row basis, and the PWM data voltages for representing the grayscales of an image are sequentially applied on a row-by-row basis.

The control signal SPAM is a signal for turning on the PAM control circuit 131PAM and may be generated by the gate signal generator 131G similar to the control signal SPWM.

When the first and second transistors TR2 and TR3 are turned on by a control signal SPAM, the PAM data voltage may be applied to the PAM control circuit 131PAM. In this case, the PAM data voltage applied to the plurality of pixel circuits 131P may be a voltage of the same magnitude or a voltage different in magnitude from region to region depending on whether the display apparatus 1 operates in a normal mode or a power saving mode.

During a period of light emission, the inorganic light emitting device 120 emits light according to the amplitude and pulse width of the drive current provided by the pixel circuit 131P, thereby representing a grayscale corresponding to the applied PAM data voltage and PWM data voltage.

Specifically, since the fifth to eighth transistors TR7 to TR10, during the light emission period, are turned on according to a control signal Emi (e.g., −5V), the PAM control circuit 131PAM and the PWM control circuit 131PWM are electrically connected to each other and also electrically connected to the power voltage terminal and the inorganic light emitting device 120.

When the light emission period starts, the power voltage VDD (for example, +5V) is applied to the inorganic light emitting device 120 through the fifth transistor TR7, the seventh transistor TR9, the first driving transistor TR1, and the eighth transistor TR10, so that a potential difference of +10 V is generated at both ends of the inorganic light emitting device 120 and the inorganic light emitting device 120 starts to emit light. In this case, the drive current for the inorganic light emitting device 120 to emit light has a fixed amplitude corresponding to the PAM data voltage.

During the light emission period, a slope voltage Vslope, which is a linearly changing voltage, is applied to the first capacitor C1. For example, when the slope voltage Vslope is a voltage gradually decreasing from +4V to 0V, a coupling voltage is generated at the gate terminal of the second driving transistor TR4 in a floating state through the first capacitor C1.

Accordingly, the voltage at node A decreases according to the slope voltage Vslope, and when the voltage at node A which has been decreased reaches the threshold voltage of the second driving transistor TR4, the second driving transistor TR4 in an off-state is turned on.

When the second driving transistor TR4 is turned on, the power voltage VDD (e.g., +5V) is transferred to node C through the fifth transistor TR7, the second driving transistor TR4, and the sixth transistor TR8. Since the power voltage VDD is +5V, when the power voltage is applied to node C, the first driving transistor TR1 is turned off. When the first driving transistor TR1 is turned off, the power voltage VDD does not reach the inorganic light emitting device 120, so that the light emission of the inorganic light emitting device 120 is terminated.

As such, the PWM control circuit 131PWM provides the inorganic light emitting device 120 with the drive current from a point in time at which the power voltage VDD (e.g., +5V) is applied to the inorganic light emitting device 120 to a point in time at which the voltage applied to the gate terminal of the second driving transistor TR4 changes according to the slope voltage Vslope to reach the threshold voltage of the second driving transistor TR4. That is, the drive current has a pulse width corresponding to the PWM data voltage.

When the display apparatus 1 operates in a normal mode, the same PAM data voltage may be applied to each of the pixel circuits 131P. When the display apparatus 1 operates in a power saving mode, the PAM data voltage applied to a specific region is adjusted such that the inorganic light emitting device 120 is supplied with a drive current smaller than the drive current supplied in a normal mode to thereby reduce the power consumption.

The PAM data voltage applied in the normal mode and the PAM data voltage applied to a specific region in the power saving mode may be set in advance. In particular, the amount of increase or decrease of the PAM data voltage applied to a specific region in the power saving mode may be set in consideration of the power saving efficiency and the like. In an embodiment, the magnitude of the PAM data voltage in a power saving mode is not limited as long as a drive current having a smaller amplitude is applied to pixels in a specific region.

In the above-described example of the pixel circuit 131P, a P-channel metal-oxide-semiconductor (PMOS) transistor is used as a driving transistor. As such, when the driving transistor is a PMOS transistor, the PAM data voltage in a normal mode is smaller than the PAM data voltage applied to a specific region in a power saving mode.

An N-channel metal-oxide semiconductor (NMOS) transistor may be used as the driving transistor. In this case, the PAM data voltage in a normal mode is greater than the PAM data voltage applied to a specific region in a power saving mode.

That is, when the display apparatus 1 operates in a power saving mode, the driver IC 200 decreases (in the case of the driving transistor being an NMOS transistor) or increases (in the case of the driving transistor being a PMOS transistor) the PAM data voltage applied to the pixel circuit 131P of a specific region so that the amplitude of the drive current applied to the inorganic light emitting device 120 may be reduced.

The timing controller 500 or the main controller 300 may determine whether to enter a power saving mode or return to a normal mode, and the driver IC 200 may apply a PAM data voltage of a magnitude that depends on whether the display apparatus 1 operates in a normal mode or in a power saving mode.

The entry into the power saving mode may be determined by the timing controller 500 or the main controller 300 or may be determined based on a user input received through the input part 420.

For example, the timing controller 500 or the main controller 300 may determine whether to enter a power saving mode based on information about an environment in which the display apparatus 1 is located. The information about the environment in which the display apparatus 1 is located may include illuminance, and may be acquired by a sensing device, such as a camera, an illuminance sensor, etc. provided in the display apparatus 1.

Alternatively, when the display apparatus 1 is located outdoors, the entry into the power saving mode may be determined according to a time zone. During the daytime, the display apparatus 1 may be operated in a normal mode to realize high luminance, and during the night time, the display apparatus 1 may be operated in a power saving mode to reduce power consumption.

As another example, the timing controller 500 or the main controller 300 may determine whether to enter the power saving mode based on whether the display apparatus 1 is watched. When there is no user input received through the input part 420 for more than a predetermined time, it is identified that there is no user watching the display apparatus 1, and the operation mode of the display apparatus 1 may be switched from a normal mode to a power saving mode.

Alternatively, when a user is not detected for more than a predetermined time by a camera or other sensors provided in the display apparatus 1, it is identified that there is no user watching the display apparatus 1.

Alternatively, when the display apparatus 1 is located in a public place, it may be determined whether to enter a power saving mode according to a time zone. During a time zone with a large floating population, the display apparatus 1 may be operated in a normal mode to realize high luminance, and during a time zone with a small floating population, the display apparatus 1 may be operated in a power saving mode to reduce power consumption. The time zone for operating the display apparatus 1 in a normal mode and the time zone for operating the display apparatus 1 in a power saving mode may be set and changed by the user.

When the entry into the power saving mode is determined based on a user input, a power saving mode button for selecting a power saving mode may be provided in the input part 420, and the timing controller 500 or the main controller 300, in response to the user selecting the power saving mode button, may switch the operation mode of the display apparatus 1 from a normal mode to a power saving mode.

The above-described conditions are merely examples applicable to the display apparatus 1 according to an embodiment. In addition to the above-described conditions, various conditions for determining the transition to a power saving mode may be used.

When the display apparatus 1 according to an embodiment operates in a power saving mode, the power consumption may be reduced not by reducing the brightness of the entire region of the image but by reducing the brightness of individual regions of the image, so that the power consumption may be reduced while minimizing the image quality degradation.

For example, the display apparatus 1 in a power saving mode may reduce the amplitude of the drive current applied to pixels disposed in some columns among the plurality of pixels disposed on the display panel 100.

As another example, the display apparatus 1 in a power saving mode may reduce the amplitude of the drive current applied to pixels disposed in some rows among the plurality of pixels disposed on the display panel 100.

As another example, the display apparatus 1 in a power saving mode may reduce the amplitude of the drive current applied to pixels disposed in a certain region among the plurality of pixels disposed on the display panel 100.

An region in which the brightness is reduced (hereinafter, referred to as a power saving region) may be determined in advance, or may be determined by the timing controller 500 or the main controller 300 based on image data.

For example, an edge region except the central portion of an image may be predetermined as a power saving region, and the timing controller 500 or the main controller 300 may determine a background region in which no person or animal is located based on image data, or a background region in which no moving object is located as a power saving region. Alternatively, an region in which a dark color is displayed may be determined as a power saving region.

The embodiment of the display apparatus 1 is not limited to the above-described example, and the power saving region may be determined in various other ways.

As described above, the amplitude of the drive current may be adjusted by the PAM data voltage. Accordingly, in order to decrease the amplitude of the drive current, the PAM data voltage needs to be increased or decreased. Hereinafter, an example of a wiring structure applicable to the display apparatus 1 to decrease the amplitude of the drive current on a region-by-region basis will be described.

Figure 10:
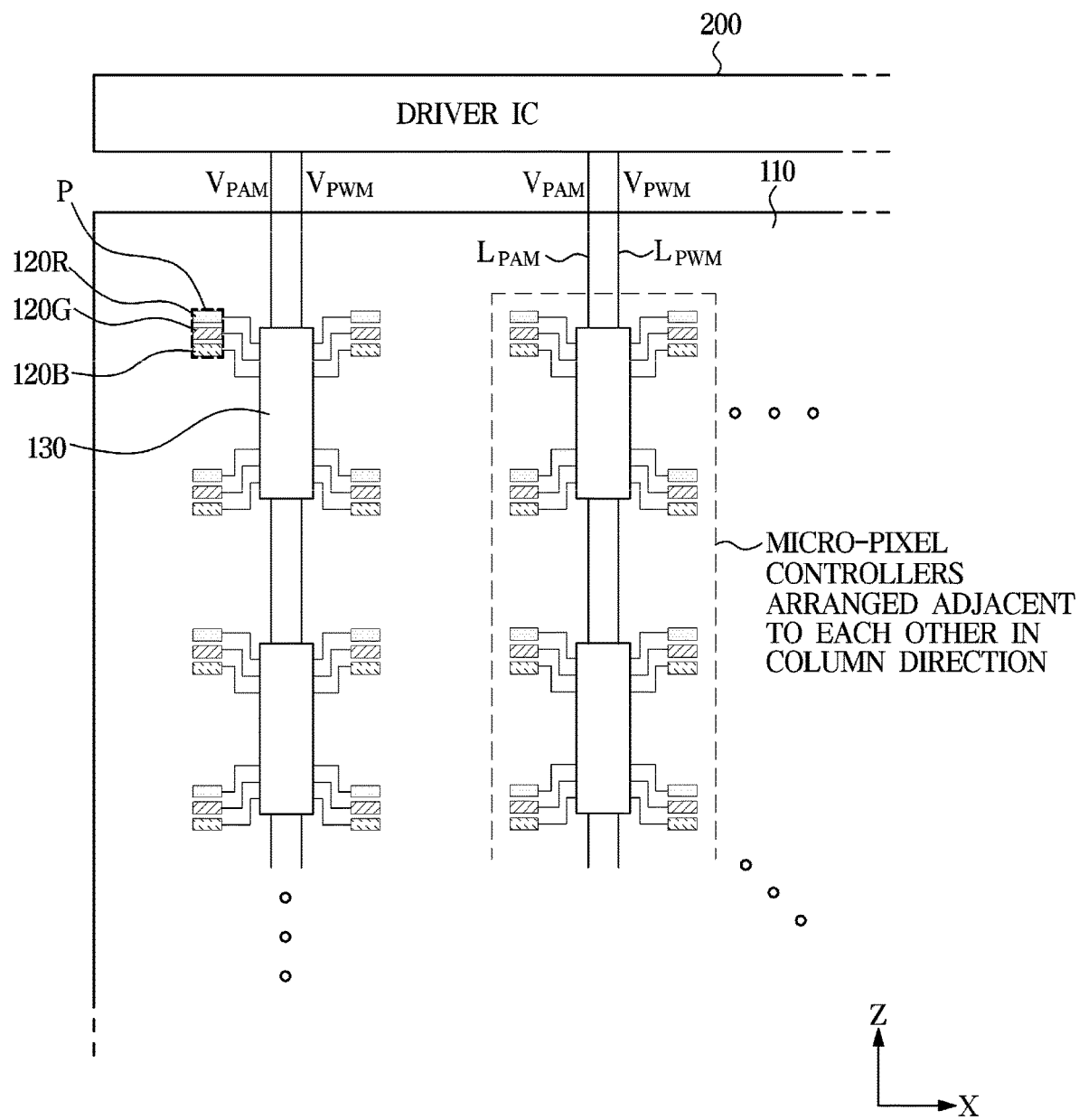
FIG. 10 is a diagram illustrating an example of a wiring structure applicable to reduce an amplitude of a drive current in units of columns in a display apparatus according to an embodiment.
Figure 11:
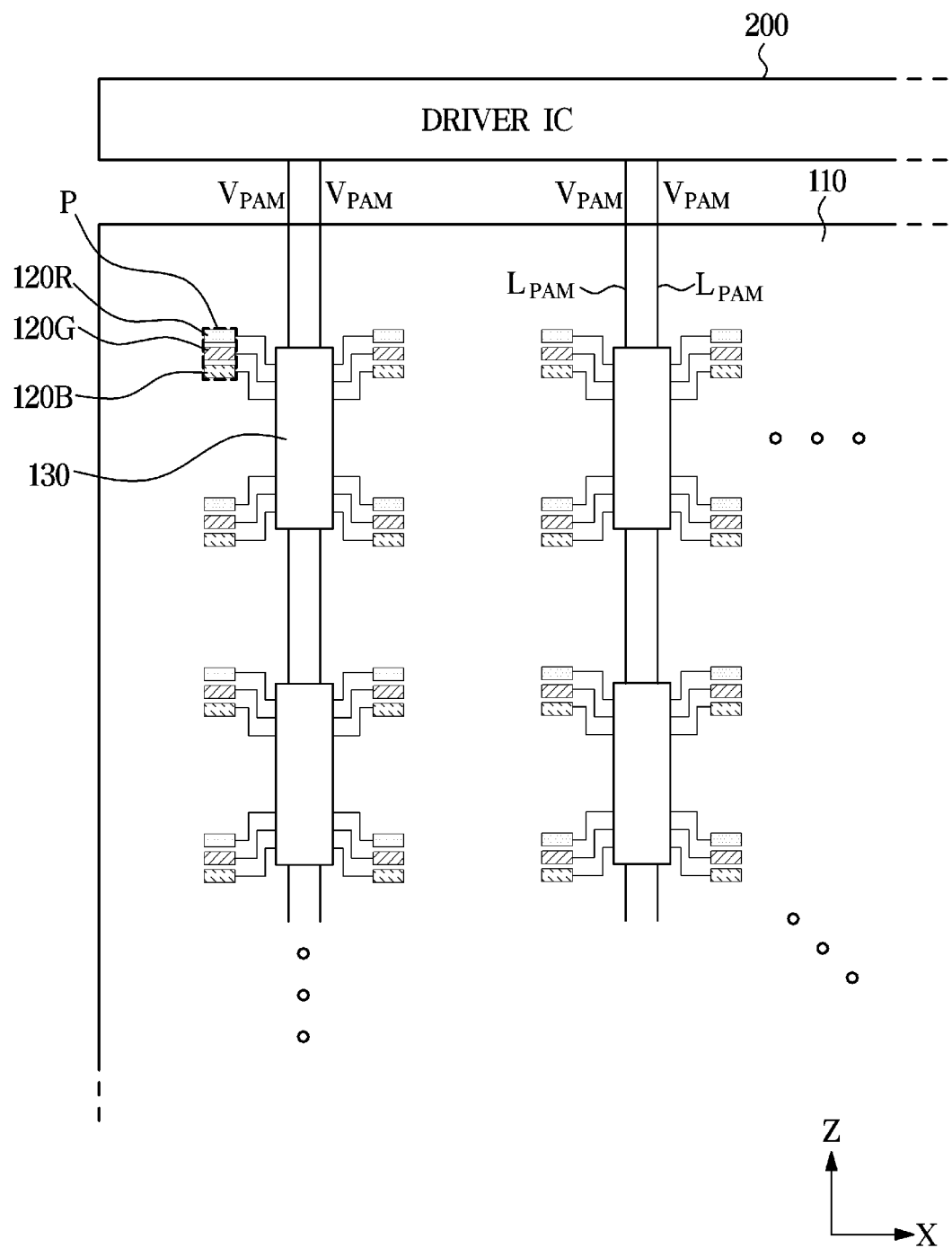
FIG. 11 is a diagram illustrating an example of a wiring structure applicable to reduce an amplitude of a drive current in units of columns in a display apparatus according to an embodiment.
Figure 12:
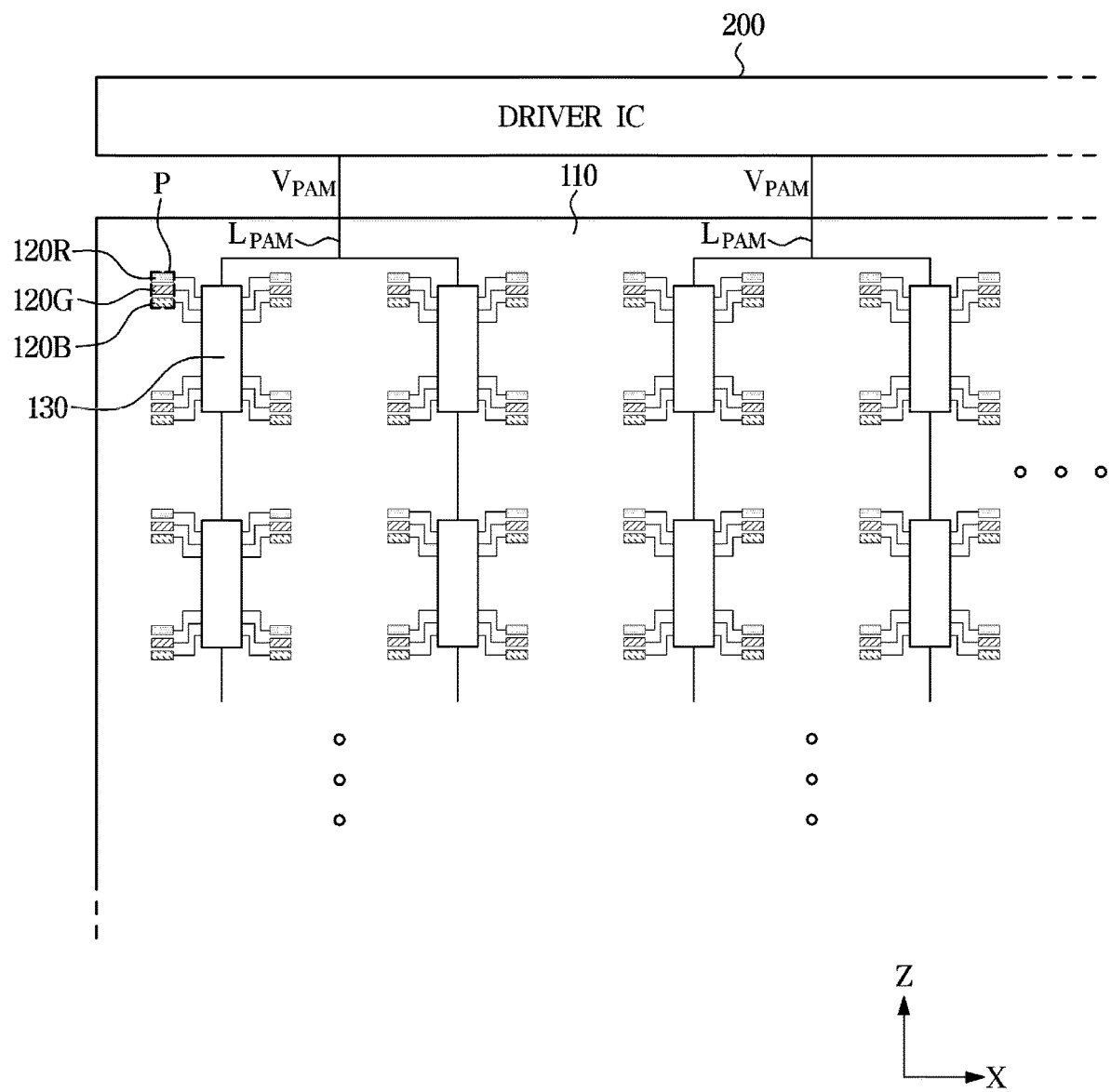
FIG. 12 is a diagram illustrating an example of a wiring structure applicable to reduce an amplitude of a drive current in units of columns in a display apparatus according to an embodiment.
Figure 13:
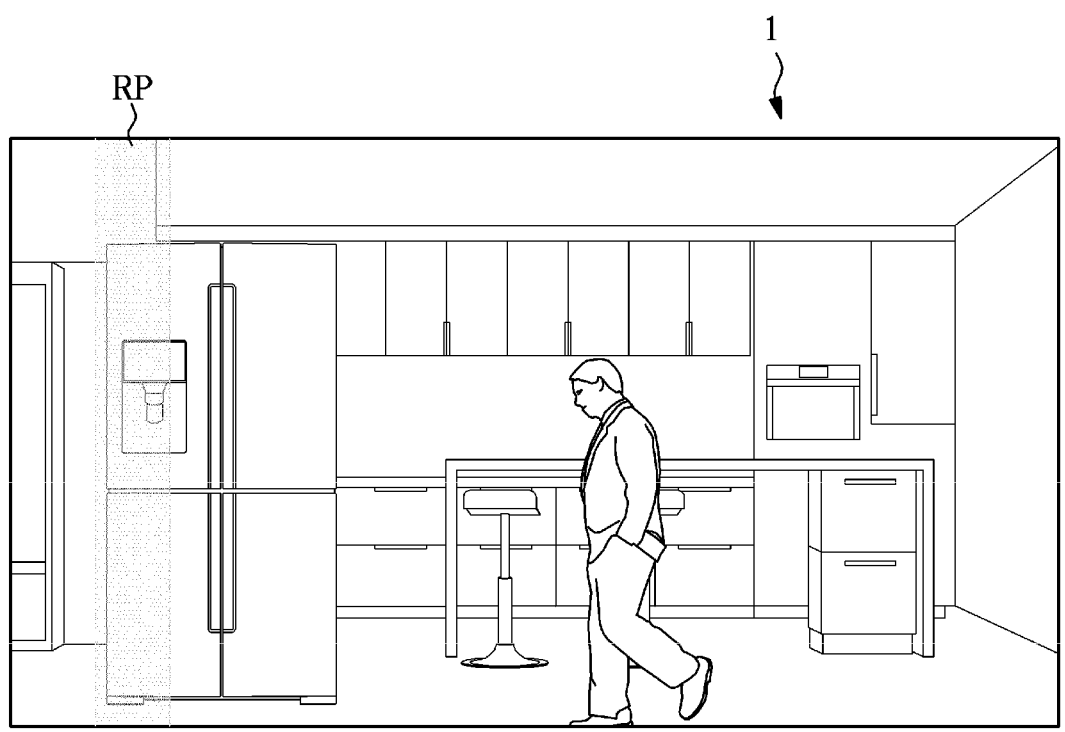
FIG. 13 is a diagram illustrating an example of a region in which brightness is controlled when a display apparatus reduces an amplitude of a drive current in units of columns according to an embodiment.
Figure 14:
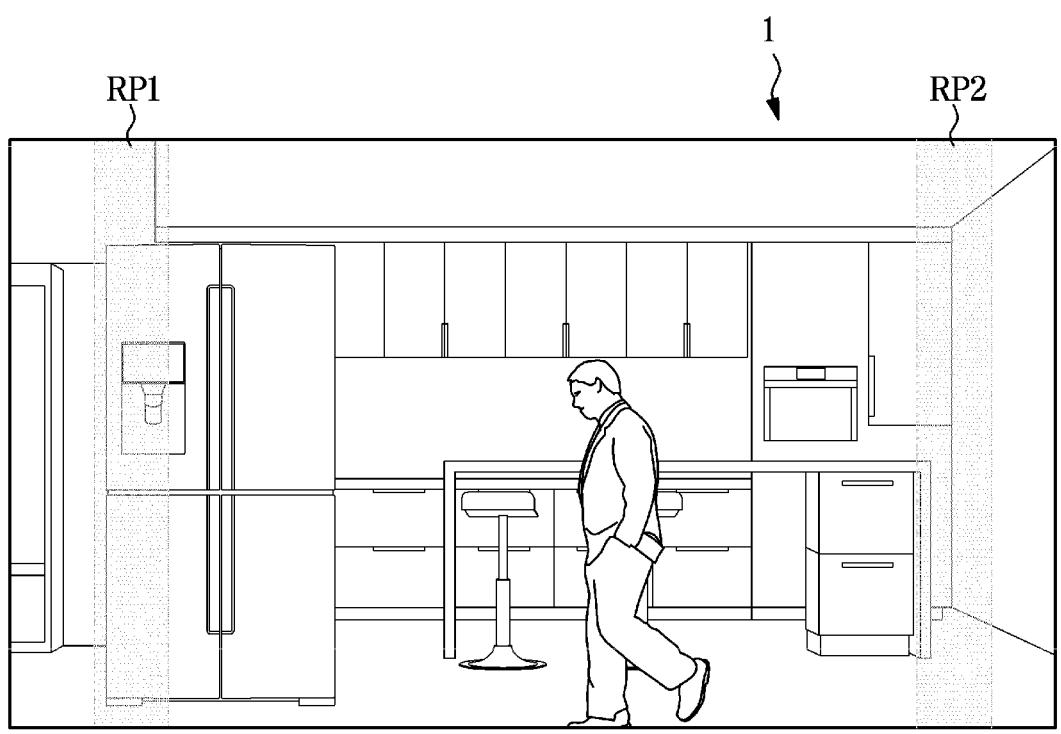
FIG. 14 is a diagram illustrating an example of a region in which brightness is controlled when a display apparatus reduces an amplitude of a drive current in units of columns according to an embodiment.

FIG. 10 is a diagram illustrating an example of a wiring structure applicable to reduce an amplitude of a drive current in units of columns in a display apparatus according to an embodiment. FIG. 11 is a diagram illustrating an example of a wiring structure applicable to reduce an amplitude of a drive current in units of columns in a display apparatus according to an embodiment. FIG. 12 is a diagram illustrating an example of a wiring structure applicable to reduce an amplitude of a drive current in units of columns in a display apparatus according to an embodiment. FIG. 13 is a diagram illustrating an example of a region in which brightness is controlled when a display apparatus reduces an amplitude of a drive current in units of columns according to an embodiment. FIG. 14 is a diagram illustrating an example of a region in which brightness is controlled when a display apparatus reduces an amplitude of a drive current in units of columns according to an embodiment.

In the following example, a case in which a single micro-pixel controller 130 controls pixels in a 2×2 array will be described as an example.

Referring to FIG. 10, the driver IC 200 and the micro-pixel controller 130 may be electrically connected to each other through a first wiring for transmitting the PAM data voltage $V_{PAM}$ and a second wiring for transmitting the PWM data voltage $V_{PWM}$. Hereinafter, the first wiring will be referred to as a PAM wiring and the second wiring will be referred to as a PWM wiring.

The PWM wiring $L_{PWM}$ may be connected to the micro-pixel controllers 130 in units of columns. Referring to FIG. 10, PWM wirings $L_{PWM}$ may be provided corresponding in number to the number of micro-pixel controllers 130 adjacent in a single row direction such that a single PWM wiring $L_{PWM}$ is connected for each micro-pixel controller 130, or PWM wirings $L_{PWM}$s may be provided corresponding in number to the number of columns constituting a plurality of pixels such that a single micro-pixel controller 130 is connected to PWM wirings $L_{PWM}$ as many as the number of columns controlled by the single micro-pixel controller 130, that the number of columns in which control target pixels of the single micro-pixel controller 130 are disposed. In the drawings following FIG. 10, illustration of the PWM wiring is omitted.

In the example of FIG. 10, a single PAM wiring $L_{PAM}$ is electrically connected to each micro-pixel controller 130, and micro-pixel controllers 130 disposed adjacent to each other in the column direction (Z-axis direction) share a single PAM wiring $L_{PAM}$. Accordingly, when a plurality of pixels are arranged in an M×N array on the display panel 100, the driver IC 200 and the display panel 100 may be connected to each other by N/n PAM wirings (n is the number of columns in which pixels controlled by a single micro-pixel controller are arranged).

The driver IC 200 may independently adjust the PAM data voltage transmitted to each PAM wiring. Accordingly, micro-pixel controllers 130 connected to the same PAM wiring $L_{PAM}$ are supplied with PAM data voltages of the same magnitude, and micro-pixel controllers 130 connected to different PAM wirings $L_{PAM}$ are supplied to PAM data voltages of different magnitudes. That is, PAM data voltages of different magnitudes may be simultaneously applied corresponding in number to the number of the PAM wirings.

Since the micro-pixel controllers 130 connected to the same PAM wiring $L_{PAM}$ are supplied with the PAM data voltages of the same magnitude, sufficient light emission time may be secured.

In an example, the micro-pixel controllers 130 disposed adjacent to each other in the column direction (Z-axis direction) are supplied with the PAM data voltages of the same magnitude, and the micro-pixel controllers 130 disposed adjacent to each other in the row direction (X-axis direction) may be supplied with the PAM data voltages of different magnitudes.

The PAM data voltage may be supplied to the micro-pixel controllers 130 disposed adjacent to each other in the column direction from a single common wiring, or the PAM data voltage may be supplied to the micro-pixel controller 130 disposed closest to the driver IC 200 (e.g., the micro-pixel controller 130 disposed on the first row), and then transferred to the next micro-pixel controller 130 adjacent in the column direction in a sequential manner.

In an example, since a single micro-pixel controller 130 controls pixels arranged in two columns, even in a power saving mode, pixels arranged in two columns may be controlled as a single unit, and the micro-pixel controllers 130 for controlling pixels belong to different units may be supplied with PAM data voltages of different magnitudes. Alternatively, the micro-pixel controllers 130 for controlling pixels belong to different units may be supplied with PAM data voltages of the same magnitude.

Since the micro-pixel controllers 130 controlling the pixels arranged in the first and second columns are connected to the same PAM wiring $L_{PAM}$, the pixels arranged in the first and second columns may be supplied with the PAM data voltage of the same magnitude. The same description may apply to the pixels arranged in the subsequent columns.

When the PAM data voltage is applied, the control circuit 131C may transmit the PAM data voltage to the pixel circuits 131P controlling the control target pixels. As an example, when a single micro-pixel controller 130 controls four pixels, PAM data voltages of the same magnitude may be input to twelve pixel circuits 131P.

Alternatively, when a plurality of pixels are arranged in an M×N array on the display panel 100, the driver IC 200 and the display panel 100 may be electrically connected to each other by N PAM wirings $L_{PAM}$ as shown in FIG. 11. That is, in order to control the amplitude of the drive current supplied to the pixels in units of columns, the PAM wirings $L_{PAM}$ may be provided corresponding in number to the number of the columns. Here, when a single micro-pixel controller 130 controls pixels arranged in n columns, n PAM wirings $L_{PAM}$ may be connected to each micro-pixel controller 130.

According to the example of FIG. 11, because a single micro-pixel controller 130 controls pixels (a 2×2 array) arranged in two different columns, two PAM wirings $L_{PAM}$ may be electrically connected to the single micro-pixel controller 130. Among the connected PAM wirings $L_{PAM}$, one PAM wiring $L_{PAM}$ may transmit a PAM data voltage for pixels disposed in one column, and the other PAM wiring $L_{PAM}$ may transmit a PAM data voltage for pixels disposed in the other column.

Alternatively, as shown in FIG. 12, the micro-pixel controllers 130 arranged adjacent in the row direction may share a single PAM wiring $L_{PAM}$ connected to the driver IC 200.

For example, two micro-pixel controllers 130 adjacent in the row direction may be grouped to be electrically connected to a single PAM wiring $L_{PAM}$. In this case, the driver IC 200 and the display panel 100 may be electrically connected to each other by N/2n PAM wirings $L_{PAM}$, and pixels arranged in 2n columns may be controlled as a unit.

A larger number of micro-pixel controllers 130 may be grouped into one unit to reduce the number of PAM wirings $L_{PAM}$. As the number of PAM wirings $L_{PAM}$ decreases, the manufacturing process is simplified, and as the number of PAM wirings $L_{PAM}$ increases, the power saving region may be finely controlled.

When the PAM wiring $L_{PAM}$ is provided as in the above-described example, the timing controller 500 or the main controller 300 may control an region, in which the brightness is reduced in a power saving mode of the display apparatus 1, in units of columns.

When the display apparatus 1 operates in a normal mode, the drive current supplied to all pixels may be controlled to be the same. When the display apparatus 1 operates in a power saving mode, as shown in FIG. 13, pixels arranged in a plurality of columns are supplied with a drive current of lowered amplitude to reduce brightness and reduce power consumption, and pixels arranged in the remaining columns are supplied with a drive current of the same amplitude as that supplied in a normal mode. Hereinafter, an region in which the brightness is reduced in a power saving mode will be referred to as a power saving region RP.

As described above, the power saving region RP may be determined in advance or determined according to a predetermined criterion. For example, as shown in FIG. 13, a background region of an image displayed on the display apparatus 1 may be determined as the power saving region RP.

Alternatively, as shown in FIG. 14, a plurality of regions spatially spaced apart from each other may be determined as power saving regions RP1 and RP2. Since the PAM data voltages are independently controlled in units of columns, the timing controller 500 or the main controller 300 may reduce only the brightness of a partial region of the image to reduce power consumption while minimizing the degradation of image quality.

In an example, a case in which a single micro-pixel controller 130 controls pixels in a 2×2 array will be described.

Figure 15:
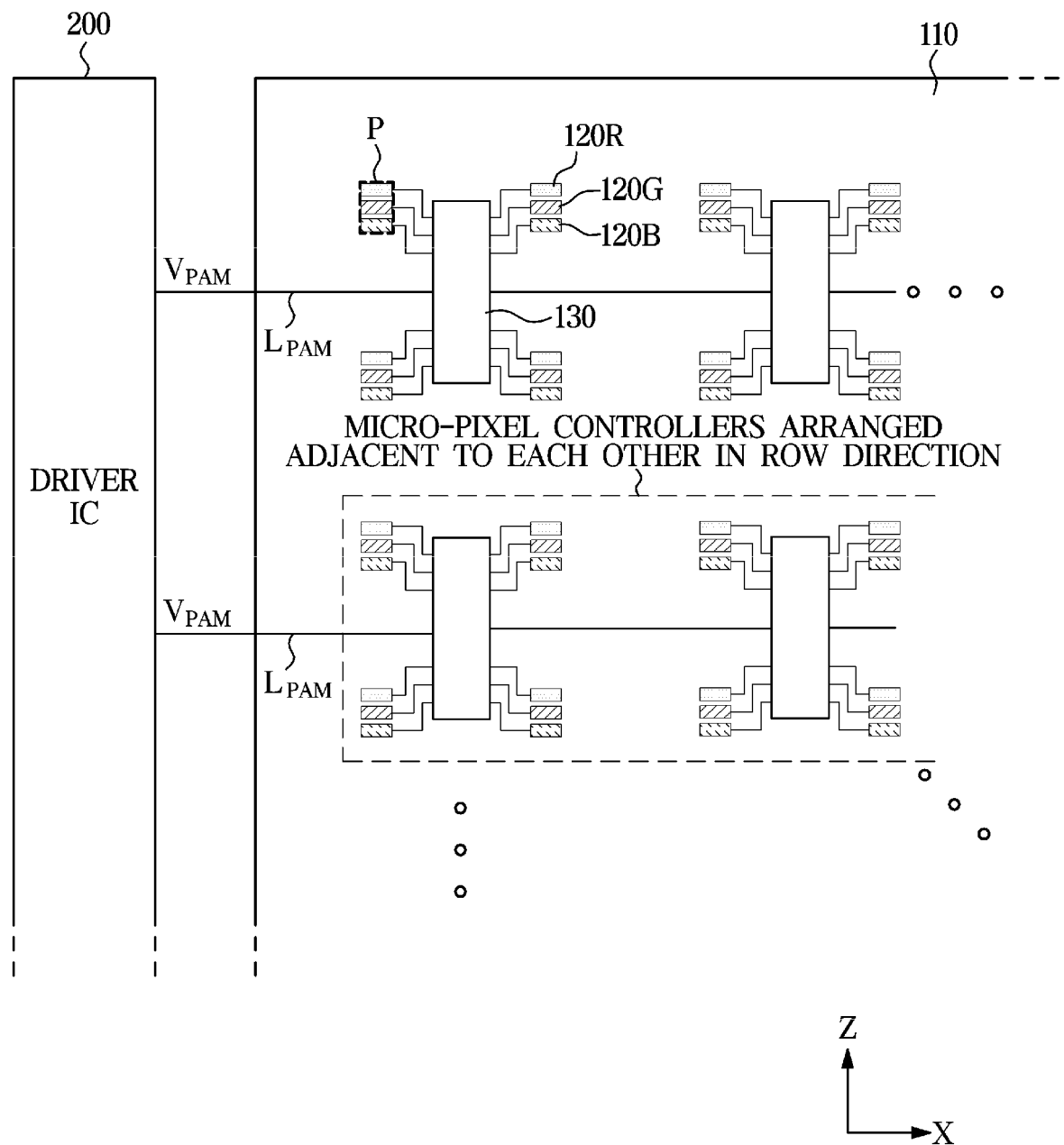
FIG. 15 is a diagram illustrating an example of a wiring structure applicable to reduce an amplitude of a drive current in units of rows in a display apparatus according to an embodiment.
Figure 16:
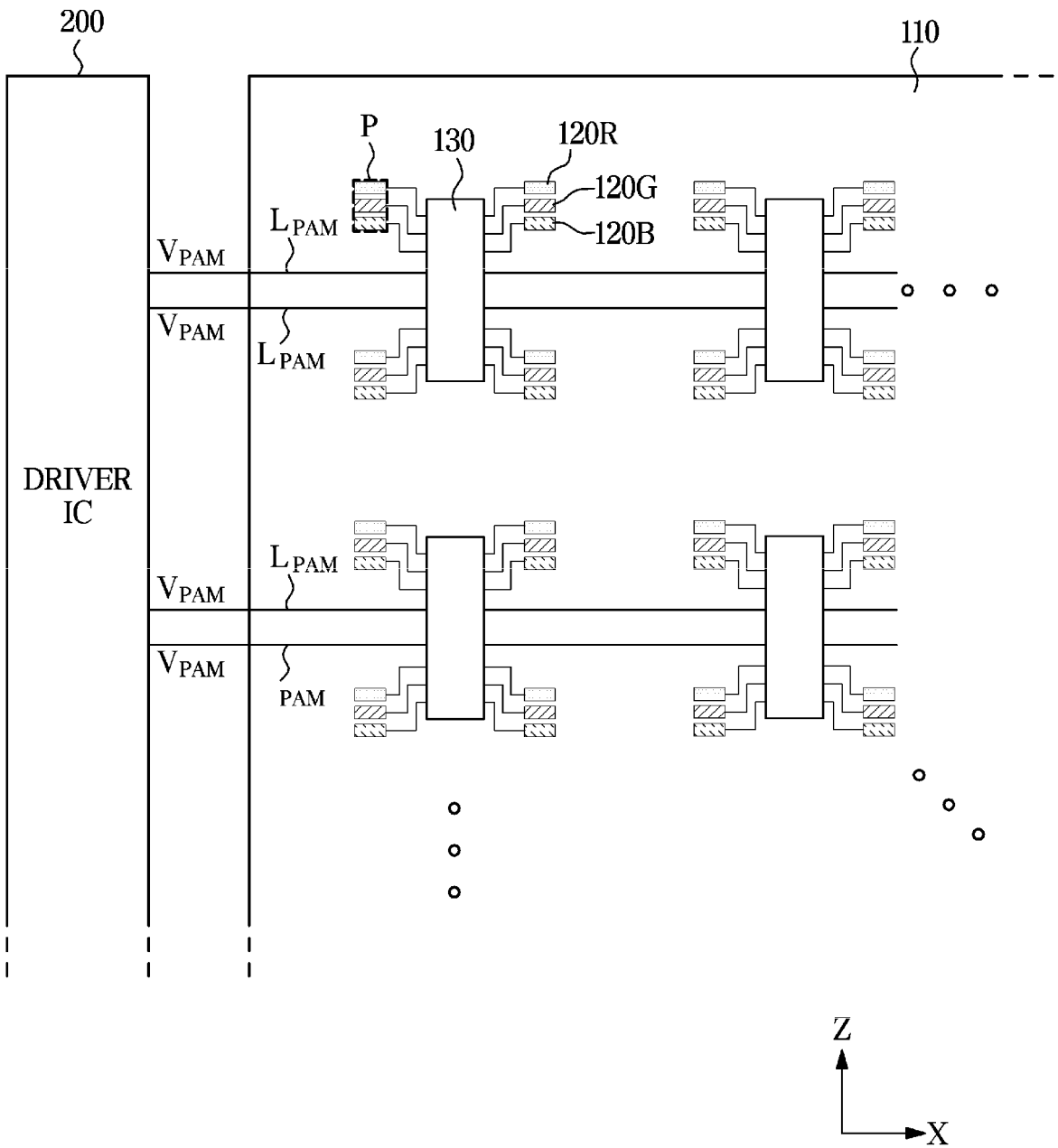
FIG. 16 is a diagram illustrating an example of a wiring structure applicable to reduce an amplitude of a drive current in units of rows in a display apparatus according to an embodiment.
Figure 17:
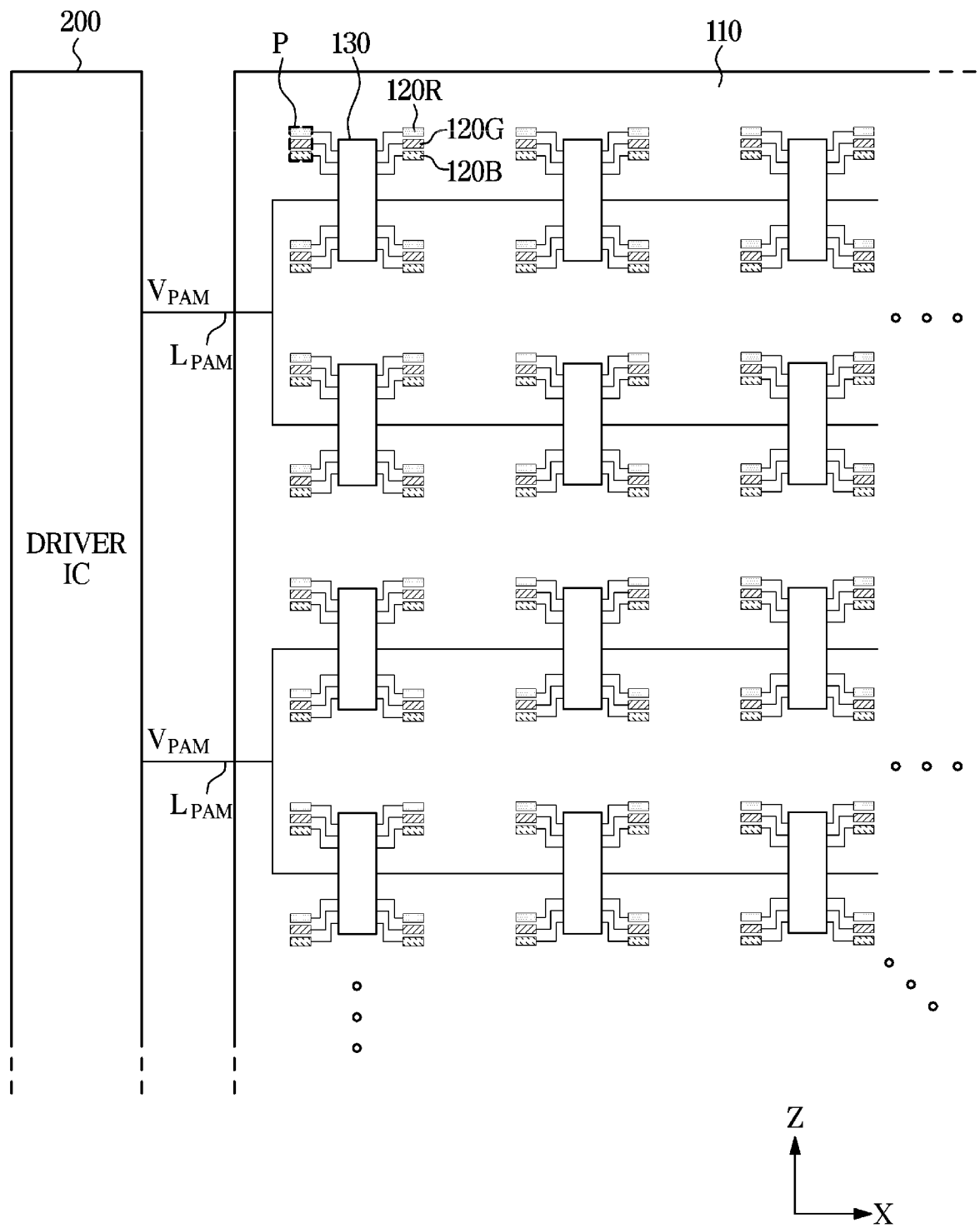
FIG. 17 is a diagram illustrating an example of a wiring structure applicable to reduce an amplitude of a drive current in units of rows in a display apparatus according to an embodiment.

FIG. 15 is a diagram illustrating an example of a wiring structure applicable to reduce an amplitude of a drive current in units of rows in a display apparatus according to an embodiment. FIG. 16 is a diagram illustrating an example of a wiring structure applicable to reduce an amplitude of a drive current in units of rows in a display apparatus according to an embodiment. FIG. 17 is a diagram illustrating an example of a wiring structure applicable to reduce an amplitude of a drive current in units of rows in a display apparatus according to an embodiment.

In the example of FIG. 15, a single PAM wiring $L_{PAM}$ is electrically connected to each micro-pixel controller 130, and the micro-pixel controllers 130 disposed adjacent to each other in the row direction may share a single PAM wiring $L_{PAM}$. Accordingly, when a plurality of pixels are arranged in an M×N array on the display panel 100, the driver IC 200 and the display panel 100 may be connected to each other by M/m PAM wirings (m is the number of rows in which pixels controlled by a single micro-pixel controller are arranged).

The driver IC 200 may independently adjust the PAM data voltage transmitted to each PAM wiring. Accordingly, the micro-pixel controllers 130 connected to the same PAM wiring $L_{PAM}$ may be supplied with PAM data voltages of the same magnitude, and the micro-pixel controllers 130 connected to different PAM wirings $L_{PAM}$ may be supplied with PAM data voltages of different magnitudes.

In an example, the micro-pixel controllers 130 disposed adjacent to each other in the row direction (X-axis direction) are supplied with the PAM data voltages of the same magnitude, and the micro-pixel controllers 130 disposed adjacent to each other in the column direction (Z-axis direction) may be supplied with the PAM data voltages of different magnitudes.

The PAM data voltage may be supplied to the micro-pixel controllers 130 disposed adjacent to each other in the row direction from a single common wiring, or the PAM data voltage may be supplied to the micro-pixel controller 130 disposed closest to the driver IC 200 (e.g., the micro-pixel controller 130 disposed on the first column), and then transferred to the next micro-pixel controller 130 adjacent in the row direction in a sequential manner.

In an example, since a single micro-pixel controller 130 controls pixels arranged in two rows, even in a power saving mode, pixels arranged in two rows may be controlled as a unit, and the micro-pixel controllers 130 for controlling pixels belong to different units may be supplied with PAM data voltages of different magnitudes. Alternatively, the micro-pixel controllers 130 for controlling pixels belong to different units may be supplied with PAM data voltages of the same magnitude.

Since the micro-pixel controllers 130 controlling the pixels arranged in the first and second rows are connected to the same PAM wiring $L_{PAM}$, the pixels arranged in the first and second rows may be supplied with the PAM data voltage of the same magnitude. The same description may apply to the pixels arranged in subsequent rows.

When the PAM data voltage is applied, the control circuit 131C may transmit the PAM data voltage to the pixel circuits 131P controlling the control target pixels. As an example, when a single micro-pixel controller 130 controls four pixels, PAM data voltages of the same magnitude may be input to twelve pixel circuits 131P.

Alternatively, when a plurality of pixels are arranged in an M×N array on the display panel 100, the driver IC 200 and the display panel 100 may be electrically connected by M PAM wirings $L_{PAM}$. That is, in order to control the amplitude of the drive current supplied to the pixels in units of rows, the PAM wirings $L_{PAM}$ may be provided corresponding in number to the number of the rows. Here, when a single micro-pixel controller 130 controls pixels arranged in m rows, m PAM wirings $L_{PAM}$ may be connected to each micro-pixel controller 130.

According to the example of FIG. 16, because a single micro-pixel controller 130 controls pixels (a 2×2 array) arranged in two different rows, two PAM wirings $L_{PAM}$ may be electrically connected to the single micro-pixel controller 130. Among the connected PAM wirings $L_{PAM}$, one PAM wiring $L_{PAM}$ may transmit a PAM data voltage for pixels disposed in one row, and the other PAM wiring $L_{PAM}$ may transmit a PAM data voltage for pixels disposed in the other row.

Alternatively, as shown in FIG. 17, the micro-pixel controllers 130 arranged adjacent in the column direction may share a single PAM wiring $L_{PAM}$ connected to the driver IC 200. For example, two micro-pixel controllers 130 adjacent in the column direction may be grouped to be electrically connected to a single PAM wiring $L_{PAM}$. In this case, the driver IC 200 and the display panel 100 may be electrically connected to each other by M/2m PAM wirings $L_{PAM}$.

When the PAM wiring $L_{PAM}$ is provided as in the above-described example, the timing controller 500 or the main controller 300 may control an region, in which the brightness is reduced in a power saving mode of the display apparatus 1, in units of rows.

Figure 18:
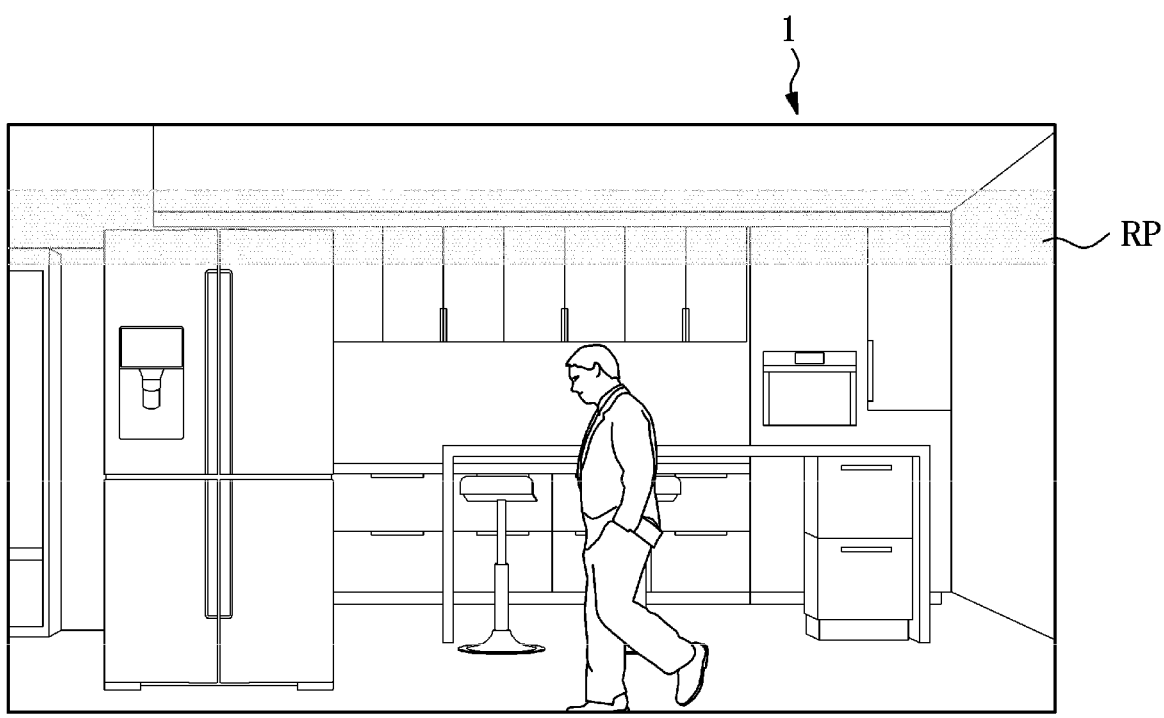
FIG. 18 is a diagram illustrating an example of a region in which brightness is controlled when a display apparatus reduces an amplitude of a drive current in units of rows according to an embodiment.
Figure 19:
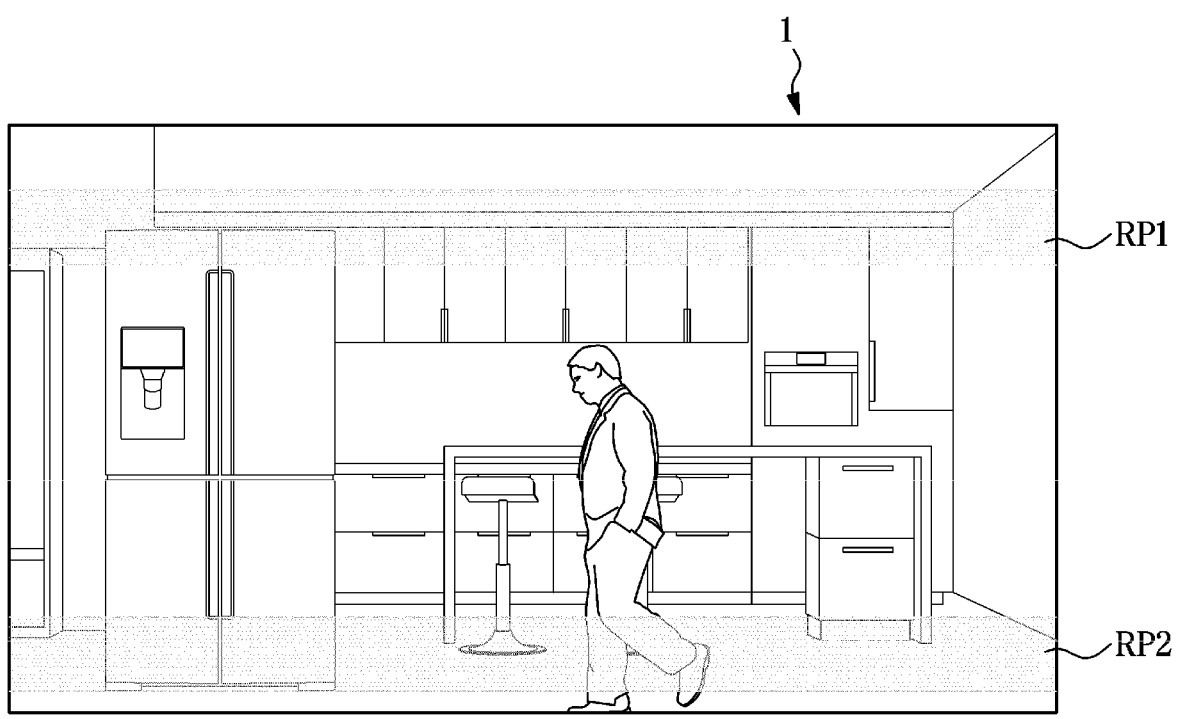
FIG. 19 is a diagram illustrating an example of a region in which brightness is controlled when a display apparatus reduces an amplitude of a drive current in units of rows according to an embodiment.

FIG. 18 is a diagram illustrating an example of a region in which brightness is controlled when a display apparatus reduces an amplitude of a drive current in units of rows according to an embodiment. FIG. 19 is a diagram illustrating an example of a region in which brightness is controlled when a display apparatus reduces an amplitude of a drive current in units of rows according to an embodiment.

Referring to FIG. 18, when the display apparatus 1 operates in a power saving mode, pixels arranged in a plurality of rows corresponding to a power saving region are supplied with the drive current smaller than the drive current supplied in a normal mode to reduce the brightness and reduce the power consumption.

Alternatively, referring to FIG. 19, a plurality of regions spatially spaced apart from each other may be determined as power saving regions RP1 and RP2. Since the PAM data voltages are independently controlled in units of rows, the timing controller 500 or the main controller 300 may reduce only the brightness of a partial region of the image, so that power consumption is reduced while minimizing the degradation of image quality.

Figure 20:
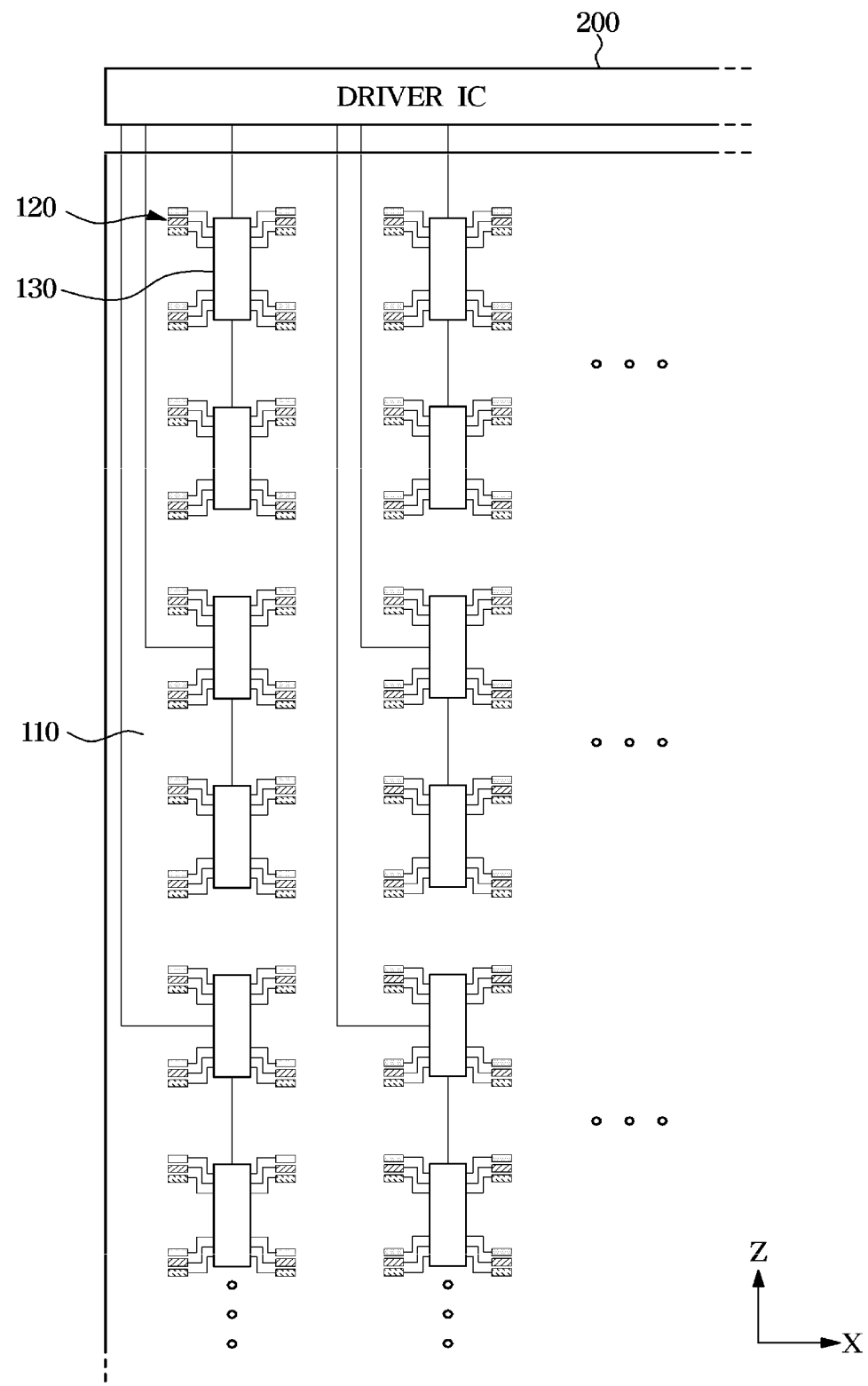
FIG. 20 is a diagram illustrating an example of a wiring structure applicable to reduce an amplitude of a drive current in units of arbitrary regions in a display apparatus according to an embodiment.
Figure 21:
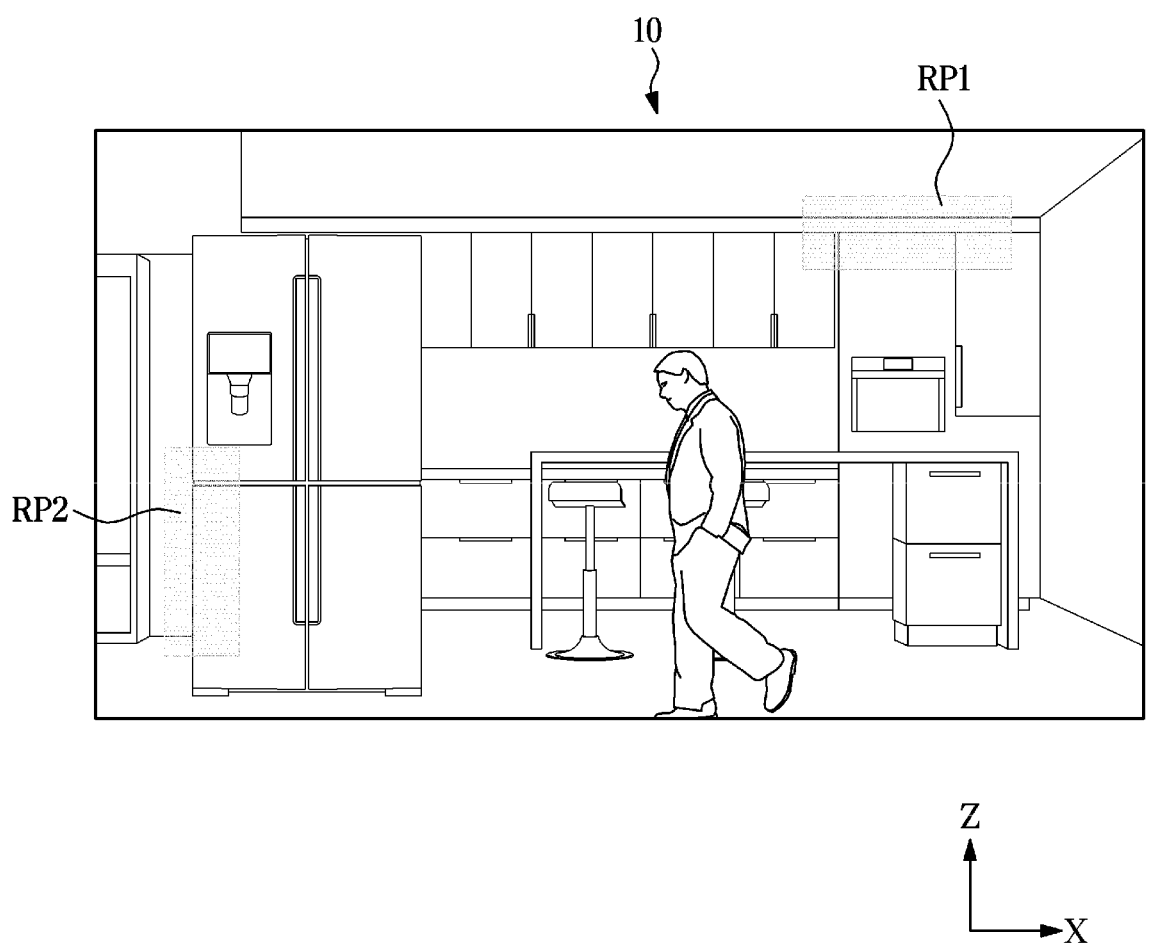
FIG. 21 is a diagram illustrating an example of a region in which brightness is controlled when a display apparatus reduces an amplitude of a drive current in units of arbitrary regions according to an embodiment.

FIG. 20 is a diagram illustrating an example of a wiring structure applicable to reduce an amplitude of a drive current in units of arbitrary regions in a display apparatus according to an embodiment. FIG. 21 is a diagram illustrating an example of a region in which brightness is controlled when a display apparatus reduces an amplitude of a drive current in units of arbitrary regions according to an embodiment.

In an example, a case in which a single micro-pixel controller 130 controls pixels in a 2×2 array will be described as an example.

In order to adjust the power saving region more delicately, the amplitude of the drive current may be controlled in units of pixels or micro-pixel controllers. In the case of controlling the amplitude of the drive current in units of micro-pixel controllers, each micro-pixel controller 130 may be electrically connected to the driver IC 200 through the PAM wiring $L_{PAM}$ to individually supply the PAM data voltage.

In the case of controlling the amplitude of the drive current in units of pixels, each micro-pixel controller 130 may be electrically connected to the driver IC 200 through PAM wirings $L_{PAM}$ corresponding in number to the number of control target pixels, so that each pixel is individually supplied with PAM data voltage.

Alternatively, a plurality of micro-pixel controllers 130 may be grouped and controlled in one unit. As shown in the example of FIG. 20, each set of two micro-pixel controllers 130 disposed adjacent to each other in the column direction may be grouped into one unit and electrically connected to the driver IC 200 through a single PAM wiring $L_{PAM}$. Alternatively, each set of two micro-pixel controllers 130 disposed adjacent to each other in the row direction may be grouped into one unit.

In an example, in the case of grouping each set of two micro-pixel controllers 130 adjacent in the column direction are grouped into one unit, pixels arranged in two columns may be supplied with the drive current by electrically connecting the display panel 100 and the driver IC 200 to each other through M/4 PAM wirings $L_{PAM}$.

Therefore, in order to supply a drive current to a plurality of pixels arranged in an M×N array, the display panel 100 and the driver IC 200 may be electrically connected to each other through a total of M/4*N/2 PAM wirings $L_{PAM}$.

When the PAM wiring $L_{PAM}$ is provided as in the above-described example, the timing controller 500 or the main controller 300 may control a region, in which the brightness is reduced in a power saving mode of the display apparatus 1, in units of arbitrary regions. The arbitrary region may include a row-basis region or a column-basis region.

As illustrated in the example of FIG. 21, when the display apparatus 1 operates in a power saving mode, the power saving regions RP1 and RP2 may be more finely adjusted. In an example, the number of power saving regions is illustrated as two, but the size and number of power saving regions are not limited.

Figure 22:
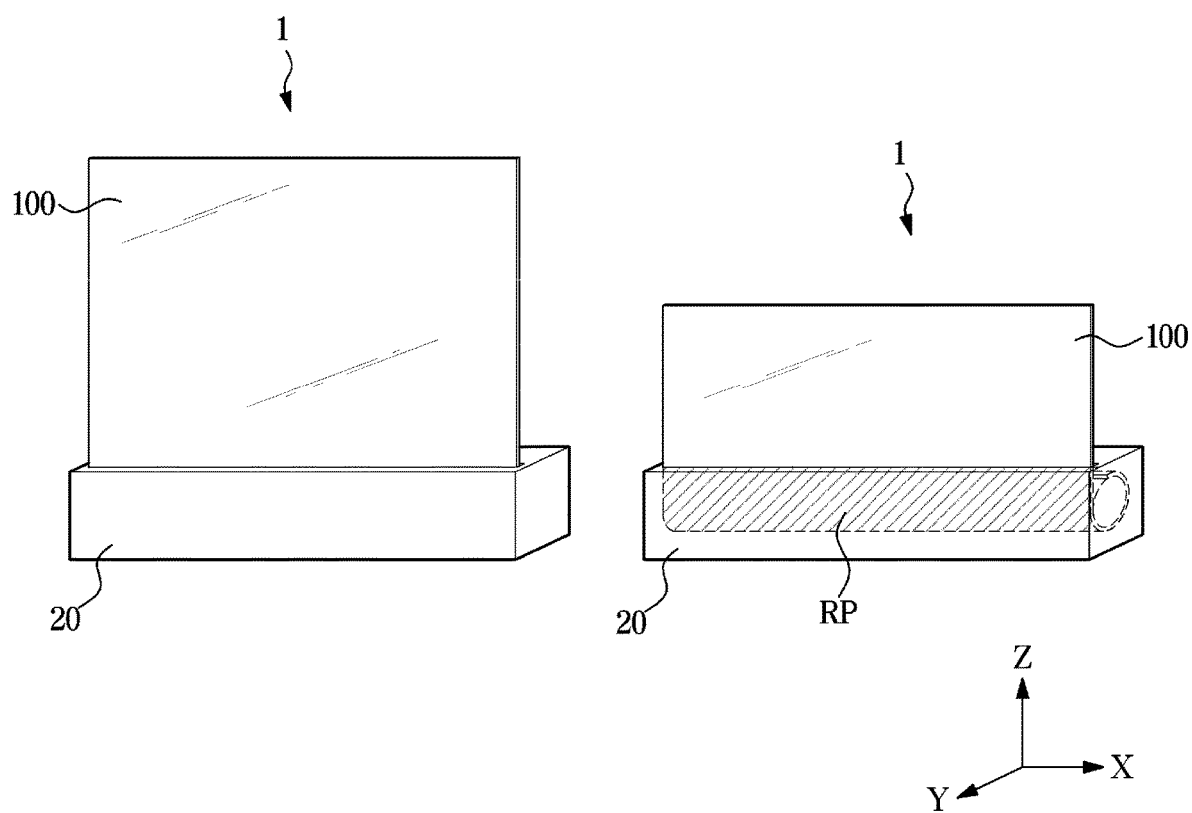
FIG. 22 is a diagram illustrating an example in which a display apparatus according to an embodiment is implemented as a rollable display apparatus.

FIG. 22 is a diagram illustrating an example in which a display apparatus according to an embodiment is implemented as a rollable display apparatus.

As described above, the display apparatus 1 according to an embodiment may implement a flexible feature by employing a micro LED as the inorganic light emitting device 120, and the flexible feature may be used to implement a rollable display apparatus as shown in FIG. 22.

In the display apparatus 1 implemented as a rollable display apparatus, the display apparatus 1 may be operated in a power saving mode when a portion of the display panel 100 is rolled inside the housing 20. In this case, the timing controller 500 or the main controller 300 may set a region rolled inside the housing 20 as the power saving region RP because the region is not visible from the outside, and may lower the amplitude of the drive current supplied to pixels corresponding to the region.

The PAM wiring may be formed based on the rolling direction of the display panel 100. For example, when the display panel 100 is rolled in the Z-axis direction (e.g., the column direction), the PAM wiring may be formed such that the amplitude of the drive current is controlled in units of rows. Alternatively, when the display panel 100 is rolled in the X-axis direction (e.g., row direction), the PAM wiring may be formed such that the amplitude of the drive current is controlled in units of columns.

Figure 23:
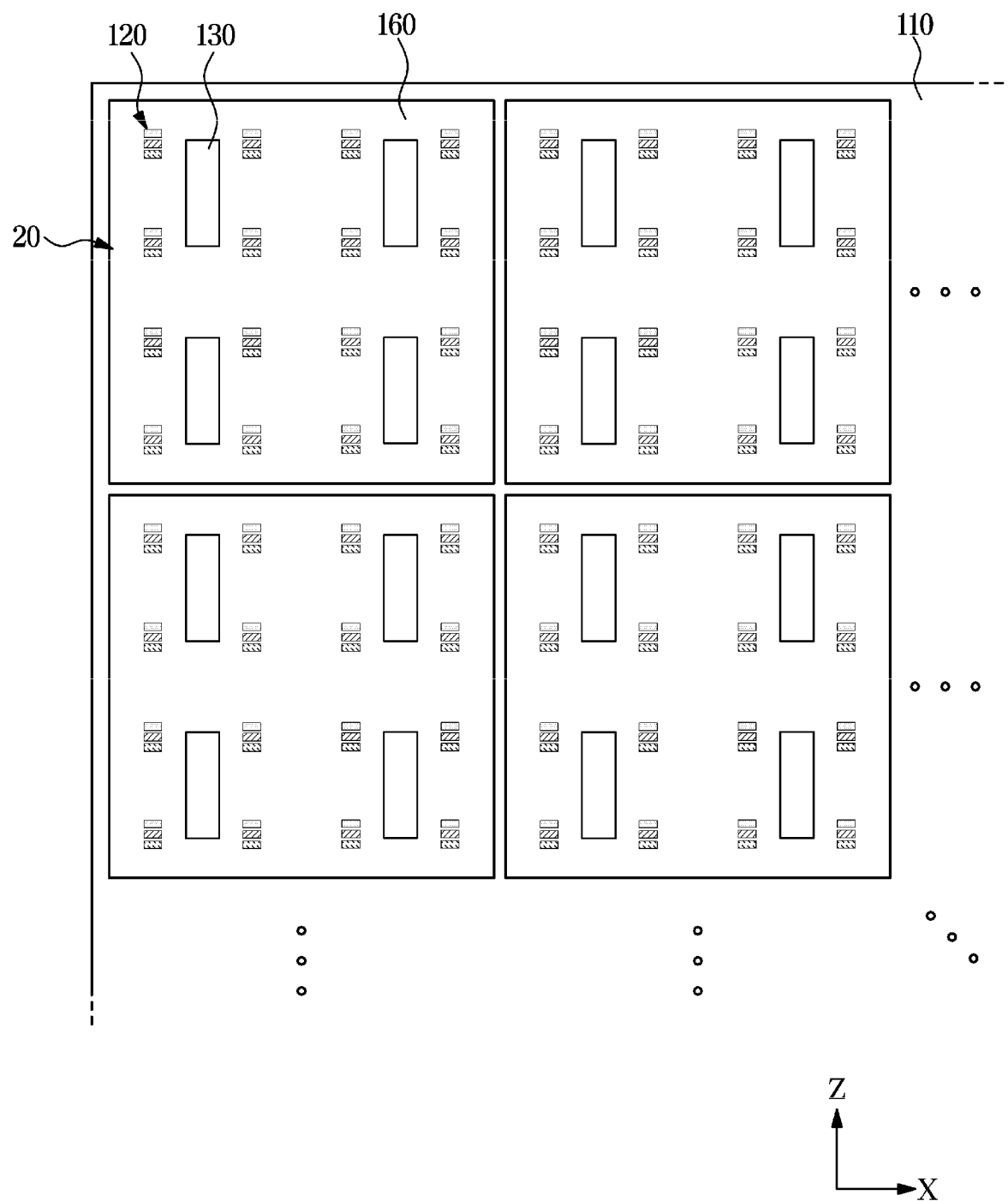
FIG. 23 is a diagram illustrating an embodiment in which a package substrate is further added between a module substrate and a micro-pixel controller in a display apparatus according to an embodiment.

FIG. 23 is a diagram illustrating an embodiment in which a package substrate is added between a module substrate and a micro-pixel controller in a display apparatus according to an embodiment.

Referring to FIG. 23, a plurality of package substrates 160 may be disposed on the module substrate 110, and a plurality of pixels P and a plurality of micro-pixel controllers 130 may be disposed on the plurality of package substrates 160.

A single package substrate 160, and a plurality of pixels P and a plurality of micro-pixel controllers 130 disposed on the single package substrate 160 may form a single micro-pixel package 20. In the example, a plurality of micro-pixel controllers 130 and control target pixels thereof are illustrated as being included in a single micro-pixel package 20, but a single micro-pixel controller 130 and control target pixels thereof may be included in a single micro-pixel package 20.

In an embodiment, because the inorganic light emitting devices 120 and the micro-pixel controller 130 for controlling the inorganic light emitting devices 120 are provided as a single package, the reliability of the inspection of the pixel circuit or the inspection of the inorganic light emitting device may be improved, and rapid inspection may be ensured, and because only packages determined as good products are mounted on the module board 110, replacement of defective products may be facilitated.

Even when the inorganic light emitting device 120 and the micro-pixel controller 130 are mounted on the package substrate 160 rather than on the module substrate 110, the positional relationship between the pixels P or the positional relationship between the pixels P and the micro-pixel controller 130, and the PAM wiring described above may apply to the description of FIG. 23.

Figure 24:
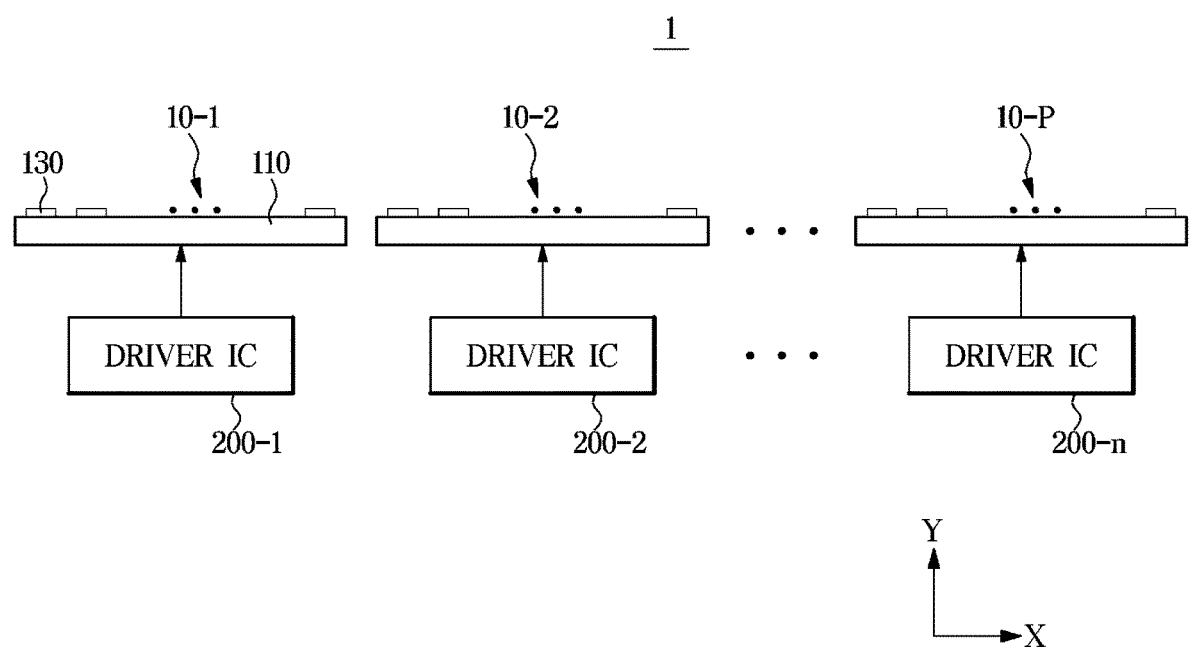
FIG. 24 is a diagram illustrating a connection relationship between a plurality of display modules and other components in a display apparatus according to an embodiment.
Figure 25:
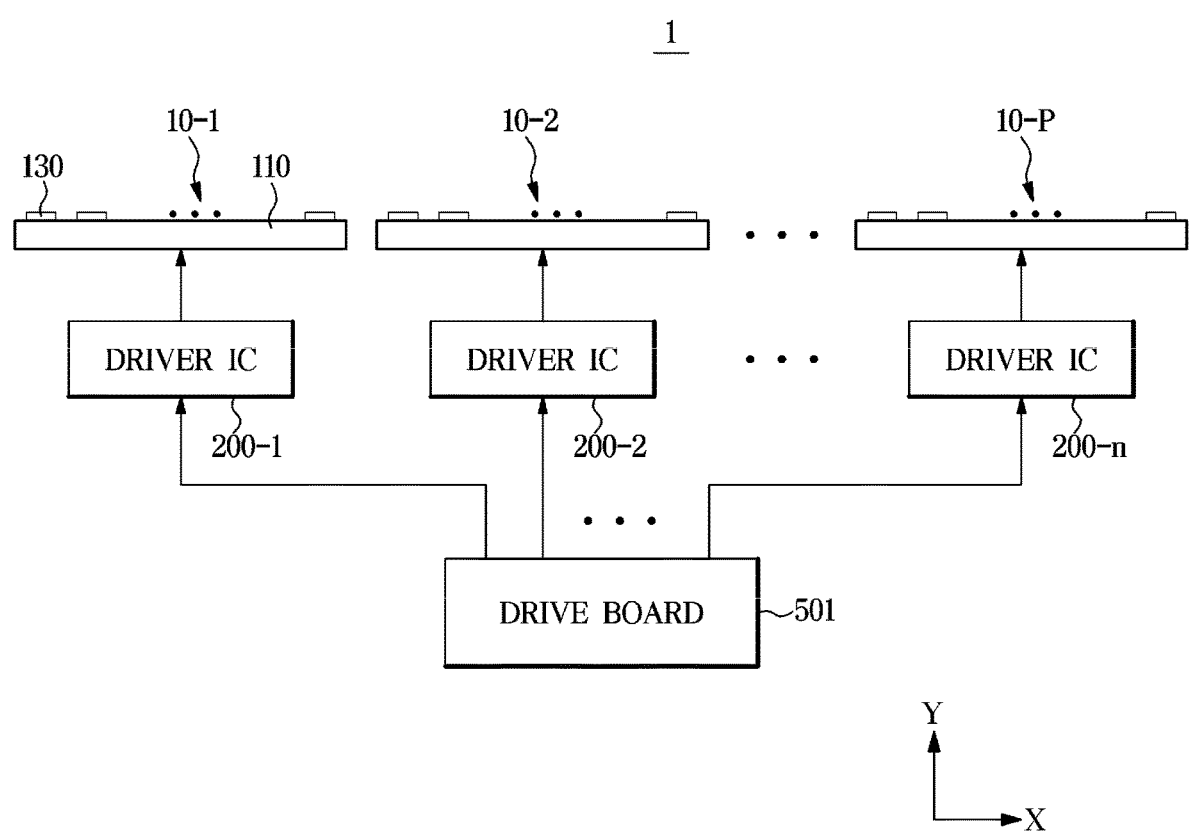
FIG. 25 is a diagram illustrating a connection relationship between a plurality of display modules and other components in a display apparatus according to an embodiment.
Figure 26:
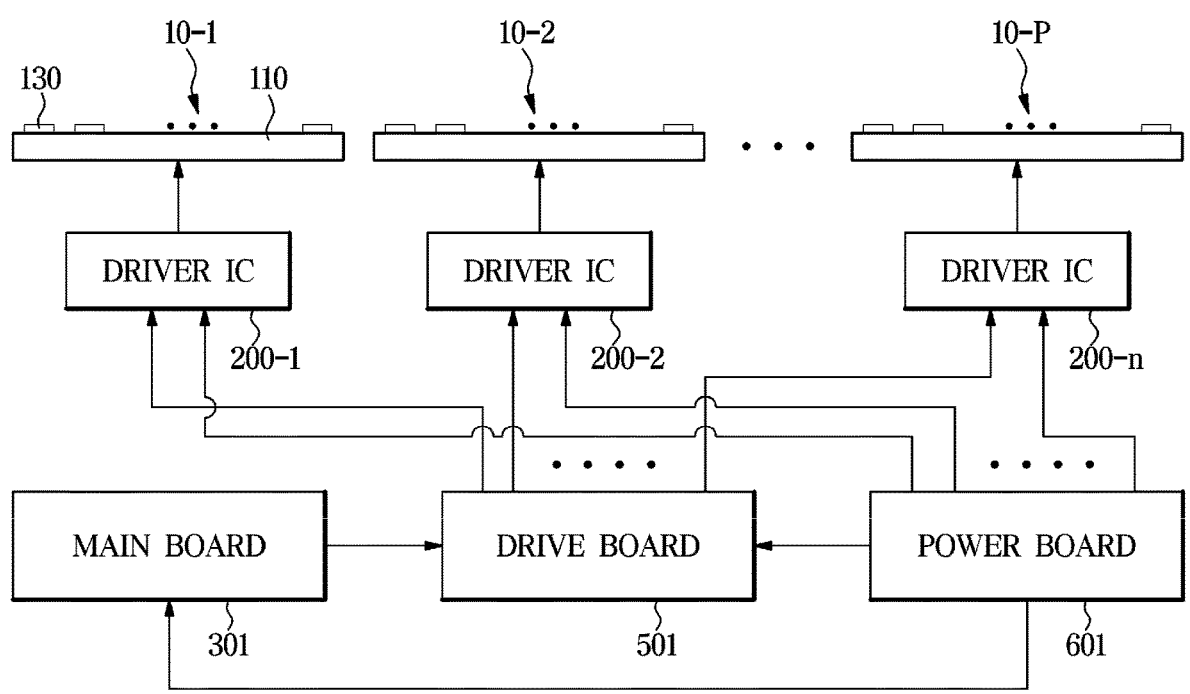
FIG. 26 is a diagram illustrating a connection relationship between a plurality of display modules and other components in a display apparatus according to an embodiment.
Figure 27:
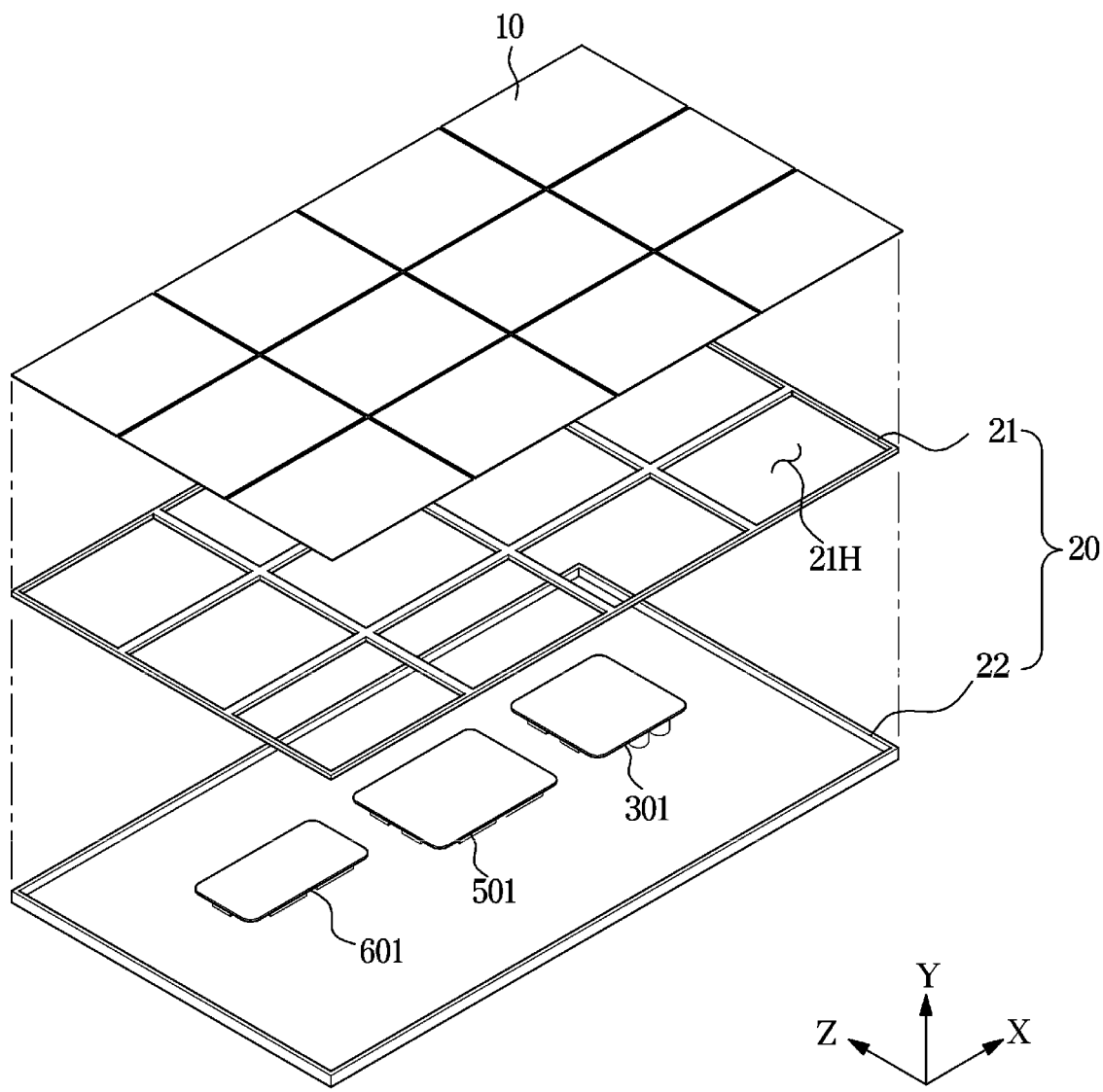
FIG. 27 is a diagram illustrating an example of a method in which a plurality of display modules are coupled to a housing in a display apparatus according to an embodiment.

FIG. 24 is a diagram illustrating a connection relationship between a plurality of display modules and other components in a display apparatus according to an embodiment. FIG. 25 is a diagram illustrating a connection relationship between a plurality of display modules and other components in a display apparatus according to an embodiment. FIG. 26 is a diagram illustrating a connection relationship between a plurality of display modules and other components in a display apparatus according to an embodiment. FIG. 27 is a diagram illustrating an example of a method in which a plurality of display modules are coupled to a housing in a display apparatus according to an embodiment.

As described above, the plurality of display modules 10-1, 10-2, . . . , and 10-*n* may be tiled to implement the display apparatus 1 having a large-region screen. FIGS. 24 to 26 are diagrams illustrating the display apparatus 1 on the XY plane, thus showing only the one-dimensional arrangement of display modules 10-1, 10-2, . . . , and 10-P, but as described above with reference to FIG. 1, it should be understood that the plurality of display modules 10-1, 10-2, . . . , 10-*n* may be arranged in two dimensions.

Referring to FIG. 24, each of the plurality of display modules 10 may include a driver IC 200-1, 200-2, . . . , 200-*n* for driving the display panel 100. The driver IC 200 may be electrically connected to the display panel 100 using one of various bonding methods, such as a chip on film (COF) or film on glass (FOG) bonding method, a chip on glass (COG) bonding method, and a tape automated bonding (TAB) method.

As an example, the display panel 100 may be connected to an FPCB through a film on which the driver ICs 200-1, 200-2, . . . , 200-*n* are mounted. The FPCB may be connected to a drive board 501 to electrically connect the display module 10 to the drive board 501 as shown in FIG. 25.

The timing controller 500 may be provided on the drive board 501. Accordingly, the drive board 501 may be referred to as a T-con board. The plurality of display modules 10-1, 10-2, . . . and 10-*n* may receive image data, a timing control signal, and the like from the drive board 501.

In addition, referring to FIG. 26, a main board 301 and a power board 601 may be further included in the display apparatus 1. The above-described main controller 300 may be provided on the main board 301, and the power circuit required for supplying power to the plurality of display modules 10-1, 10-2, . . . and 10-*n* may be provided on the power board 601.

The power board 601 may be connected to the plurality of display modules 10-1, 10-2, . . . and 10-*n* through the FPCB and may supply a power voltage VDD, a reference voltage Vss, various types of operating power, and the like to the plurality of display modules 10-1, 10-2, . . . and 10-*n* electrically connected thereto through the FPCB.

In the above-described example, it is described that the plurality of display modules 10-1, 10-2, . . . and 10-*n* share the drive board 501, but a separate drive board 501 may also be connected to each of the display modules 10. Alternatively, the plurality of display modules 10-1, 10-2, . . . and 10-P are grouped, and one drive board 501 may also be connected to each group.

FIG. 27 is a diagram illustrating an example of a method in which a plurality of display modules are coupled to a housing in a display apparatus according to an embodiment.

As described above, the plurality of display modules 10 may be two-dimensionally arranged in a matrix type and fixed to the housing 20. Referring to the example of FIG. 27, the plurality of display modules 10 may be installed on a frame 21 positioned under the plurality of display modules 10, and the frame 21 may have a two-dimensional mesh structure of which some regions corresponding to the plurality of display modules 10 are open.

Specifically, openings 21H, of which the number is the same as the number of the display modules 10, may be formed in the frame 21, and an array of the openings 21H may be the same as an array of the plurality of display modules 10.

A periphery region of the lower surface of each of the plurality of display modules 10 may be provided on the frame 21. The periphery region of the lower surface may be an region in which a circuit element or wiring the micropixel is not disposed.

The plurality of display modules 10 may be installed on the frame 21 by using a magnetic force of a magnet, being coupled thereto by a mechanical structure, or being adhered thereto by an adhesive. A method of installing the display module 10 on the frame 21 is not limited.

The drive board 501, the main board 301, and the power board 601 may be disposed under the frame 21 and electrically connected to the plurality of display modules 10 through the openings 21H formed in the frame 21.

A lower cover 22 is coupled to a lower portion of the frame 21, and the lower cover 22 may form an exterior of the lower surface of the display apparatus 1.

In the above-described embodiment, although an example in which the display modules 10 are two-dimensionally arranged is described, the display modules 10 may also be one-dimensionally arranged, and in this case, a structure of the frame 21 may be changed to a one-dimensional mesh structure.

In addition, the above described shape of the frame 21 is only an example applicable to the embodiment of the display apparatus, and the display module 10 may be fixed by employing the frame 21 in various shapes.

Figure 28:
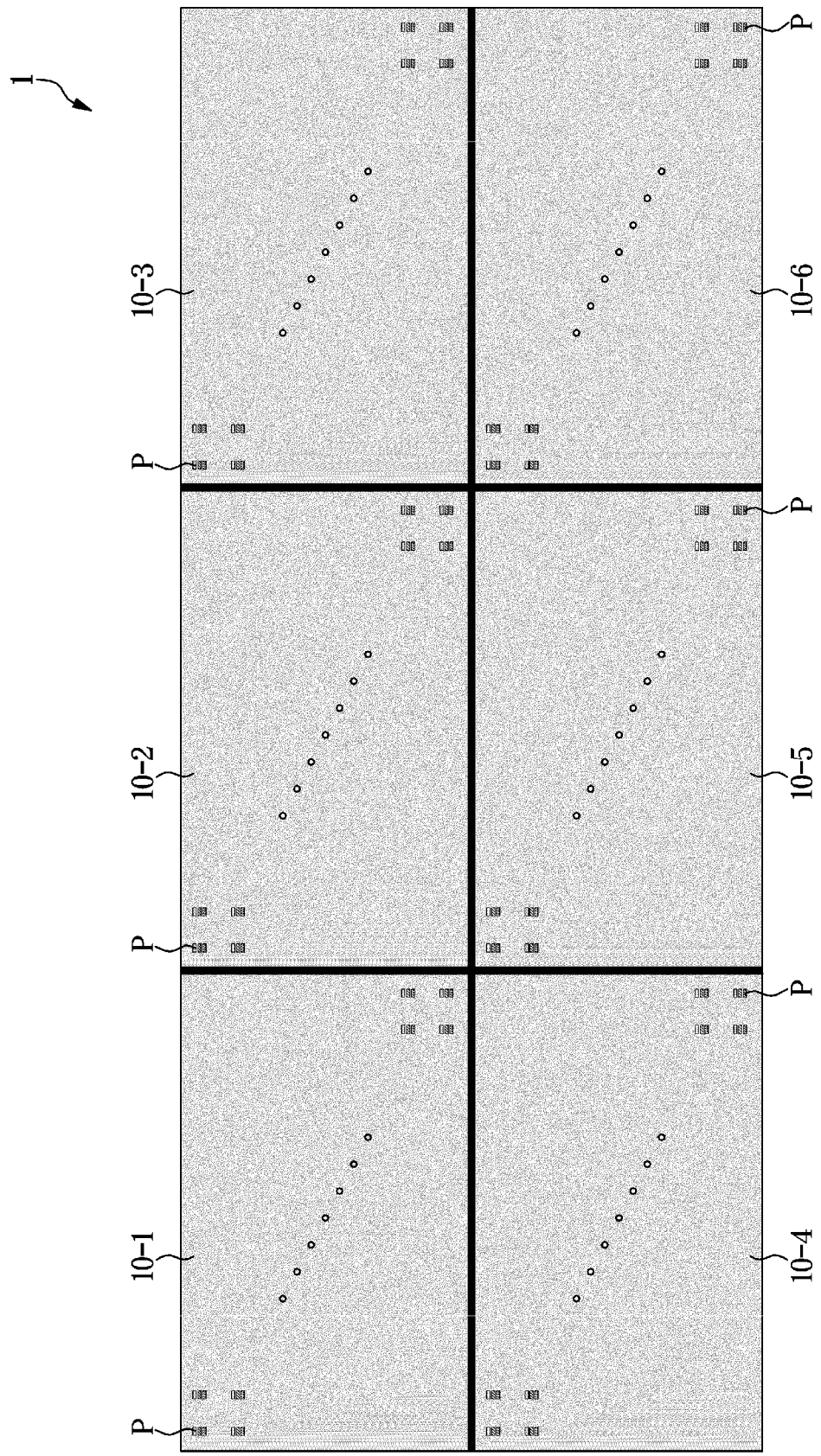
FIG. 28 is a diagram illustrating an example of black matrix (BM) processing performed on a plurality of display modules in a display apparatus according to an embodiment.

FIG. 28 is a diagram illustrating an example of black matrix (BM) processing performed on a plurality of display modules in a display apparatus according to an embodiment.

Referring to FIG. 28, the BM process may be performed on each of display modules 10-1 to 10-6 to block unnecessary light except for light required for implementing an image, prevent scattered reflection of light occurring at gaps between the pixels, and improve contrast.

For example, a BM layer may be formed on the upper surface of the module substrate 110 by applying one of various BM processing methods, such as printing black ink on the upper surface of the module substrate 110, performing patterning using a black photosensitive material, or using a black anisotropic conductive film (ACF) when the inorganic light emitting device 120 is mounted on the module substrate 110.

In addition, the BM process may be performed on an upper surface of the micro-pixel controller 130 to form a BM layer.

In addition, the BM process may be performed on spaces between the plurality of display modules 10 to prevent scattered reflection of light occurring in gaps between the modules.

Figure 29:
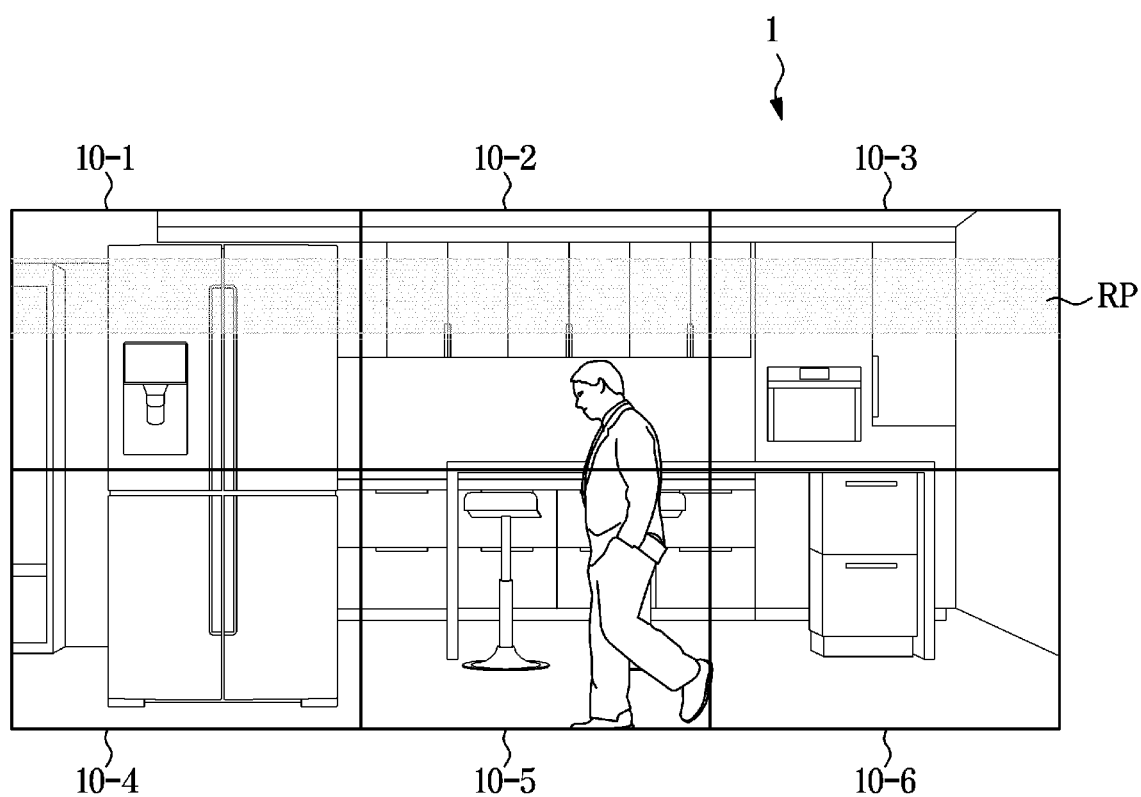
FIG. 29 is a diagram illustrating a display apparatus according to an embodiment, showing an example of a power saving region that may be set when a plurality of display modules constitute one display apparatus.

FIG. 29 is a diagram illustrating a display apparatus according to an embodiment, showing an example of a power saving region that may be set when a plurality of display modules constitute one display apparatus.

Referring to FIG. 29, images displayed on a plurality of display modules 10-1, 10-2, 10-3, 10-4, 10-5, and 10-6 are combined to form a single image displayed on the display apparatus 1. That is, a single input image may be divided into a plurality of images to display each divided image on a corresponding one of the display modules 10.

Alternatively, the plurality of display modules 10-1, 10-2, 10-3, 10-4, 10-5, and 10-6 may all display the same image, or display images independent of each other.

Even when the plurality of display modules 10-1, 10-2, . . . , and 10-*n* form a single display apparatus 1, the above description of each display module 10 may be applicable in the same manner.

When a single display module 10 is operable to control the PAM data voltage in units of rows, the other display modules 10 may also control the PAM data voltage in units of rows.

When a single display module 10 is operable to control the PAM data voltage in units of columns, the other display modules 10 may also control the PAM data voltage in units of columns.

When a single display module 10 is operable to control the PAM data voltage in units of arbitrary regions, the other display modules 10 may also control the PAM data voltage in units of arbitrary regions.

Alternatively, some display modules 10 may control the PAM data voltage in units of rows, and the remaining display modules 10 may control the PAM data voltage in units of columns.

When the display apparatus 1 operates in a power saving mode, the timing controller 500 or the main controller 300 may control the power saving regions to match each other between the plurality of display modules 10.

When the display apparatus 1 controls the PAM data voltage in units of rows, among a plurality of display modules 10-1, 10-2, 10-3, 10-4, 10-5, and 10-6 in a 2×3 array forming the display apparatus 1, the display modules 10-1, 10-2, and 10-3 or the display modules 10-4, 10-5, and 10-6 disposed in the same row may be controlled to have power saving regions in the same position, and display modules arranged in different rows may be controlled to have power saving regions in different positions. In the example shown in drawings, the power saving region RP is set only on the display modules 10-1, 10-2, and 10-3 arranged in the first row, not on the display modules 10-4, 10-5, and 10-6 arranged in the second row.

As is apparent from the above, according to a display module and a display apparatus including the same according to one aspect of the disclosure, since a thin film transistor circuit configured to drive an inorganic light emitting device is provided in a separate chip, circuit testing and replacement and a manufacturing process of the display module or the display apparatus including the display module may be more easily performed.

The above-described detailed description describes example embodiments of the disclosure, and the disclosure may be used through various other combinations, modifications, and environments. That is, the disclosure may be changed or modified within a range of the concept of the disclosure, a range equivalent to the disclosed contents, and/or a range of a technology or knowledge of the art. The above-described embodiments describe examples to realize the technical spirit of the disclosure, and various modifications required in specific application fields and uses of the disclosure may also be implemented. Therefore, the above-described detailed description of the disclosure is not intended to limit the disclosure in the disclosed embodiments. In addition, it should be interpreted that the range of the appended claims also includes other embodiments.

What is claimed is:

1. A display module comprising:
a module substrate;
a plurality of pixels provided on the module substrate, each of the plurality of pixels comprising an inorganic light emitting diode; and
a plurality of micro-pixel controllers provided in spaces between the plurality of pixels and configured to supply a drive current to at least two pixels among the plurality of pixels,
wherein each micro-pixel controller of the plurality of micro-pixel controllers comprises a pixel circuit configured to, based on a first voltage and a second voltage being applied to the micro-pixel controller, control an amplitude of the drive current based on the first voltage and control a pulse width of the drive current based on the second voltage, and
wherein, based on the display module being in a power saving mode, the first voltage is adjusted to decrease the amplitude of the drive current applied to the inorganic light emitting diode of a pixel in a specified region, among the plurality of pixels.

2. The display module of claim 1, wherein the first voltage is adjusted in units of columns, and
wherein the specified region is defined by pixels provided in at least one column.

3. The display module of claim 2, wherein the first voltage of a same magnitude is applied to micro-pixel controllers that control pixels provided in one column, among the plurality of micro-pixel controllers.

4. The display module of claim 2, wherein the first voltage of a same magnitude is applied to micro-pixel controllers adjacent to each other in a column direction, among the plurality of micro-pixel controllers.

5. The display module of claim 2, further comprising a first wiring through which the first voltage is applied to the plurality of micro-pixel controllers, the first wiring being provided on each set of micro-pixel controllers of the at least one column, and
wherein each set of micro-pixel controllers comprises at least two micro-pixel controllers of the micro pixel controllers that are adjacent to each other in a column direction.

6. The display module of claim 1, wherein the first voltage is adjusted in units of rows, and
wherein the specified region is defined by pixels provided in at least one row.

7. The display module of claim 6, wherein the first voltage of a same magnitude is applied to micro-pixel controllers that control pixels provided in a same row, among the plurality of micro-pixel controllers.

8. The display module of claim 6, wherein the first voltage of a same magnitude is applied to micro-pixel controllers among the plurality of micro-pixel controllers adjacent to each other in a row direction.

9. The display module of claim 6, further comprising a first wiring through which the first voltage is applied to the plurality of micro-pixel controllers, the first wiring being provided on each set of micro-pixel controllers of the at least one row, and
wherein each set of micro-pixel controllers comprises two or more micro-pixel controllers that are adjacent to each other in a row direction.

10. The display module of claim 1, wherein the plurality of micro-pixel controllers are divided into a plurality of groups, and the specified region is defined by pixels controlled by micro-pixel controllers included in at least one group among the plurality of groups.

11. The display module of claim 10, wherein micro-pixel controllers belonging to a same group, among the plurality of micro-pixel controllers, are supplied with a same magnitude of the first voltage.

12. The display module of claim 1, wherein, based on the display module being in a normal mode, the plurality of micro-pixel controllers are supplied with a same magnitude of the first voltage.

13. The display module of claim 1, wherein the display module further comprises a first wiring through which either the first voltage or the second voltage is applied to at least two adjacent micro-pixel controllers of the plurality of micro-pixel controllers.

14. A display apparatus comprising:
- a module substrate;
- a plurality of pixels provided on the module substrate, each of the plurality of pixels comprising an inorganic light emitting diode;
- a plurality of micro-pixel controllers provided in spaces between the plurality of pixels and configured to control two or more pixels among the plurality of pixels;
- a driver integrated circuit (IC) configured to apply a first voltage and a second voltage to the plurality of micro-pixel controllers;
- wherein each micro-pixel controller of the plurality of micro-pixel controllers comprises a plurality of pixel circuits configured to, based on the first voltage and the second voltage being applied from the driver IC, control an amplitude of a drive current according to the first voltage and control a pulse width of the drive current according to the second voltage, and
- wherein the driver IC is further configured to, based on the display apparatus being in a power saving mode, apply the first voltage of which a magnitude is increased or decreased to decrease the amplitude of the drive current applied to the inorganic light emitting diode of a pixel among the plurality of pixels in a specified region.

15. The display apparatus of claim 14, further comprising a timing controller configured to determine the specified region based on image data.

16. The display apparatus of claim 14, wherein, based on the display apparatus being in a normal mode, the driver IC is further configured to apply the first voltage of a same magnitude to the plurality of micro-pixel controllers.

17. A method of a display device, comprising:
- supplying, with a plurality of micro-pixel controllers, a drive current to two or more pixels among a plurality of pixels, wherein each of the two or more pixels comprises an inorganic light emitting diode;
- controlling, with the plurality of micro-pixel controllers, an amplitude of the drive current based on to a first voltage and a pulse width of the drive current based on a second voltage in response to the first voltage and the second voltage being applied from a driver integrated circuit (IC); and
- based on the display device in a power saving mode, decreasing the amplitude of the drive current applied to the inorganic light emitting diode of a pixel among the plurality of pixels in a specified region by adjusting the first voltage.

18. The method of claim 17, wherein the first voltage is adjustable in units of columns, and
wherein the specified region is defined by pixels provided in at least one column.

19. The method of claim 18, further comprising supplying a number of micro-pixel controllers from among the plurality of micro-pixel controllers that are provided in a first column with a same magnitude of the first voltage.

20. The method of claim 17, wherein the first voltage is adjustable in units of rows, and
wherein the specified region is defined by pixels provided in at least one row.

21. The method of claim 17, further comprising supplying a number of micro-pixel controllers from among the plurality of micro-pixel controllers that are provided in a first row with a same magnitude of the first voltage.

* * * * *